United States Patent
Cummings

(10) Patent No.: US 7,571,334 B2
(45) Date of Patent: Aug. 4, 2009

(54) MULTIPLE-CHANNEL AGILE HIGH-VOLTAGE SEQUENCER

(76) Inventor: Eric Cummings, 1159 Rebecca Dr., Livermore, CA (US) 94550

( * ) Notice: Subject to any disclaimer, the term of this patent is extended or adjusted under 35 U.S.C. 154(b) by 667 days.

(21) Appl. No.: 10/978,922

(22) Filed: Nov. 1, 2004

(65) Prior Publication Data

US 2007/0069765 A1  Mar. 29, 2007

Related U.S. Application Data

(60) Provisional application No. 60/516,133, filed on Oct. 31, 2003.

(51) Int. Cl.
*G06F 1/26* (2006.01)
(52) U.S. Cl. ...................... 713/330; 713/300
(58) Field of Classification Search ................. 713/330, 713/300
See application file for complete search history.

(56) References Cited

U.S. PATENT DOCUMENTS 6,429,706 B1 * 8/2002 Amin et al. ............... 327/143
2002/0144163 A1 * 10/2002 Goodfellow et al. ...... 713/300

* cited by examiner

*Primary Examiner*—Tse Chen
(74) *Attorney, Agent, or Firm*—Lynn & Lynn

(57) ABSTRACT

A high-voltage sequencer system includes positive and negative high-voltage supplies. A supply regulator is connected to the positive high-voltage supply. A master sequencer and programmable logic controller is connected to the supply regulator to control operation thereof. A high voltage regulator output circuit is connected to the supply regulator to receive high voltage signals therefrom. A plurality of sequencer circuits is connected between the master sequencer and programmable logic controller and the high voltage regulator output. The sequencer circuits provide signals to the high voltage regulator output to produce corresponding high-voltage signal outputs in selected sequences.

5 Claims, 30 Drawing Sheets

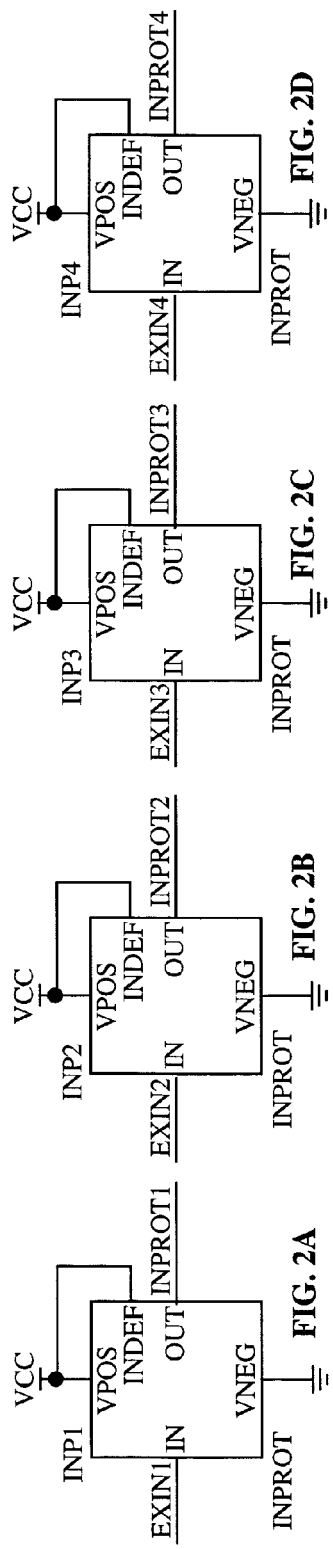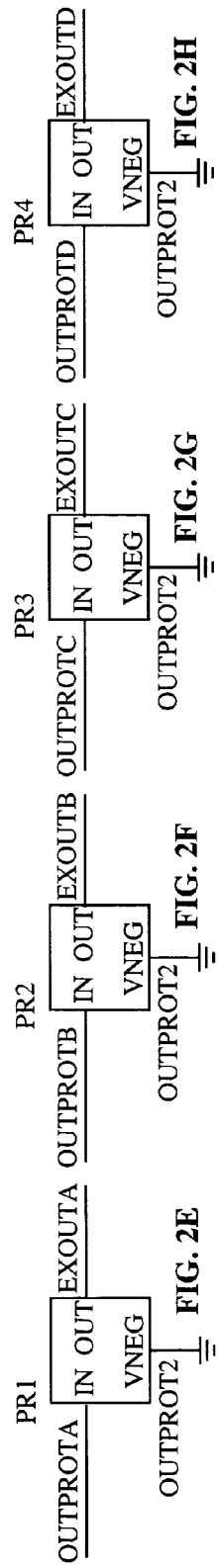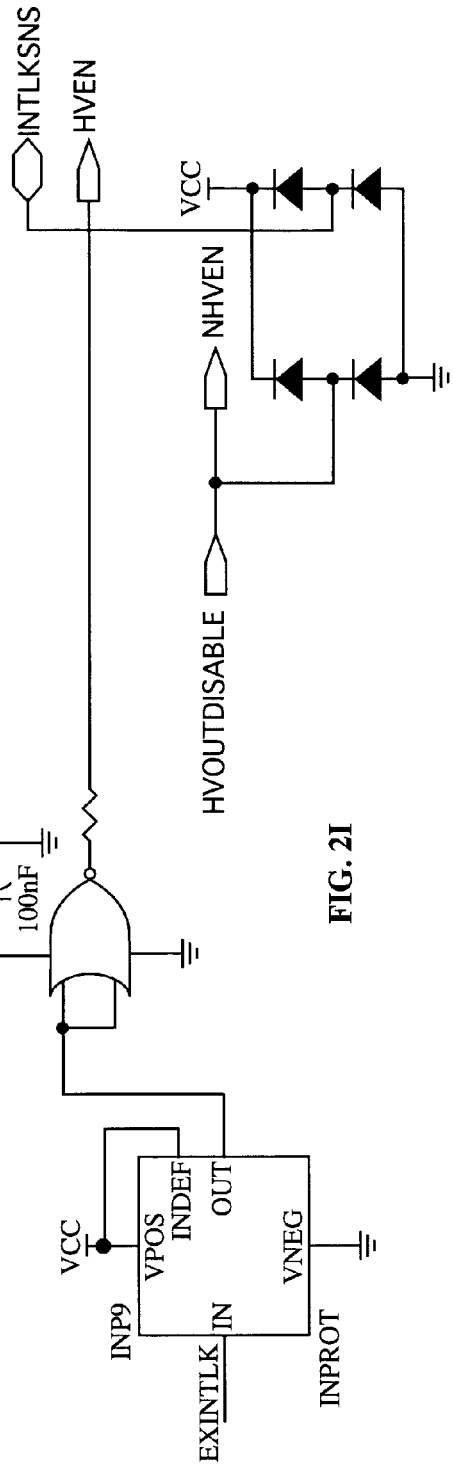

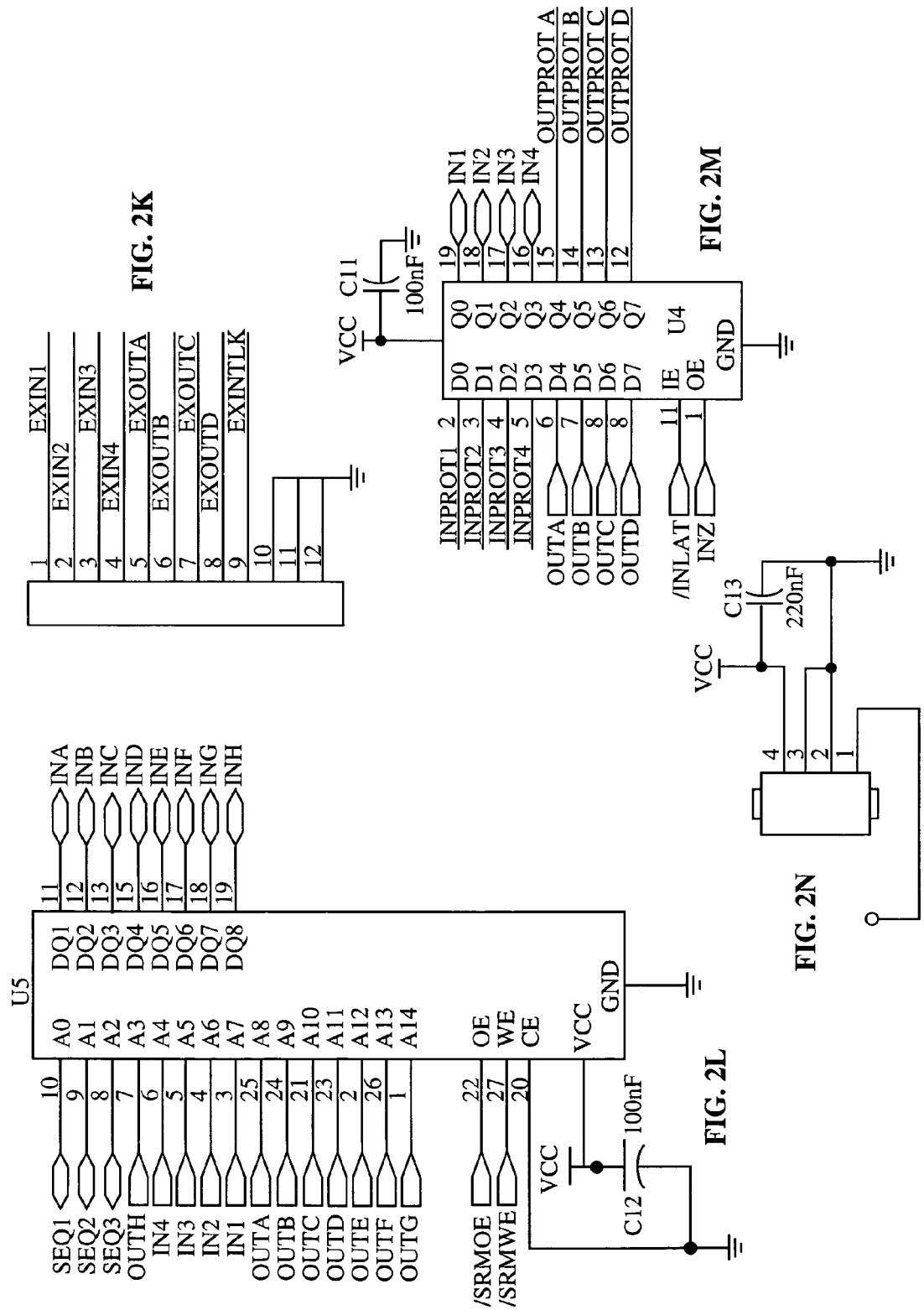

MULTIPLE-CHANNEL AGILE HIGH-VOLTAGE SEQUENCER

CROSS REFERENCE TO RELATED APPLICATION

Applicant claims priority under U.S. Provisional Patent Application No. 60/516,133 filed Oct. 31, 2003.

The invention is directed to a multiple-channel agile high-voltage sequencer that may be used in micro electromechanical systems (MEMs) and microfluidics applications. The invention is a "sequencer" in the sense that each channel can adjust its output state while executing sequences of instructions, or programs. These programs may resemble those of a programmable calculator, allowing each channel to modulate its output according to a prescribed output waveform, or in reaction to digital stimuli, analog stimuli, or mathematical operations. The output state can be a regulated voltage, regulated current, high-impedance input. Because each channel can sense the current and voltage and adjust its output according to mathematical operations on these measurements, each channel can be programmed to perform more sophisticated or complicated regulation functions automatically. In addition, the channels can coordinate their functions by communicating with each other, a programmable master controller, and external apparatus, and an external controller (e.g., a computer) in a variety of ways.

MEMS and microfluidics research require precise high-voltage supplies, with coordinated switching of multiple high voltage channels. Open-loop voltage or current control is insufficient to meet the requirements of such applications. A suitable power supply must be able to sense and react in real time.

SUMMARY OF THE INVENTION

While high-voltage power supplies are common pieces of equipment, and multiple-channel high-voltage power supplies have been developed by a number of companies and researchers, the combination of the "programmable calculator"-style embedded control of each supply according to the invention provides functions needed for automation, e.g., of MEMs and microfluidics systems, and facilitates advanced open and closed-loop control of such systems. The invention also integrates high-resolution voltage and current sensing using a novel "floating monitor" method. The invention is also includes complete field reprogrammability, which allows users to upgrade and update the functions of their units as new features and control algorithms are developed. This ability, which is novel among laboratory apparatus, helps to prevent apparatus from becoming obsolete and allows easy customization of the invention to support a customer's requirements.

The invention may be better understood and appreciated by referring to the accompanying drawings that illustrate an exemplary preferred embodiment of the invention.

DETAILED DESCRIPTION OF THE INVENTION

Figure 1:
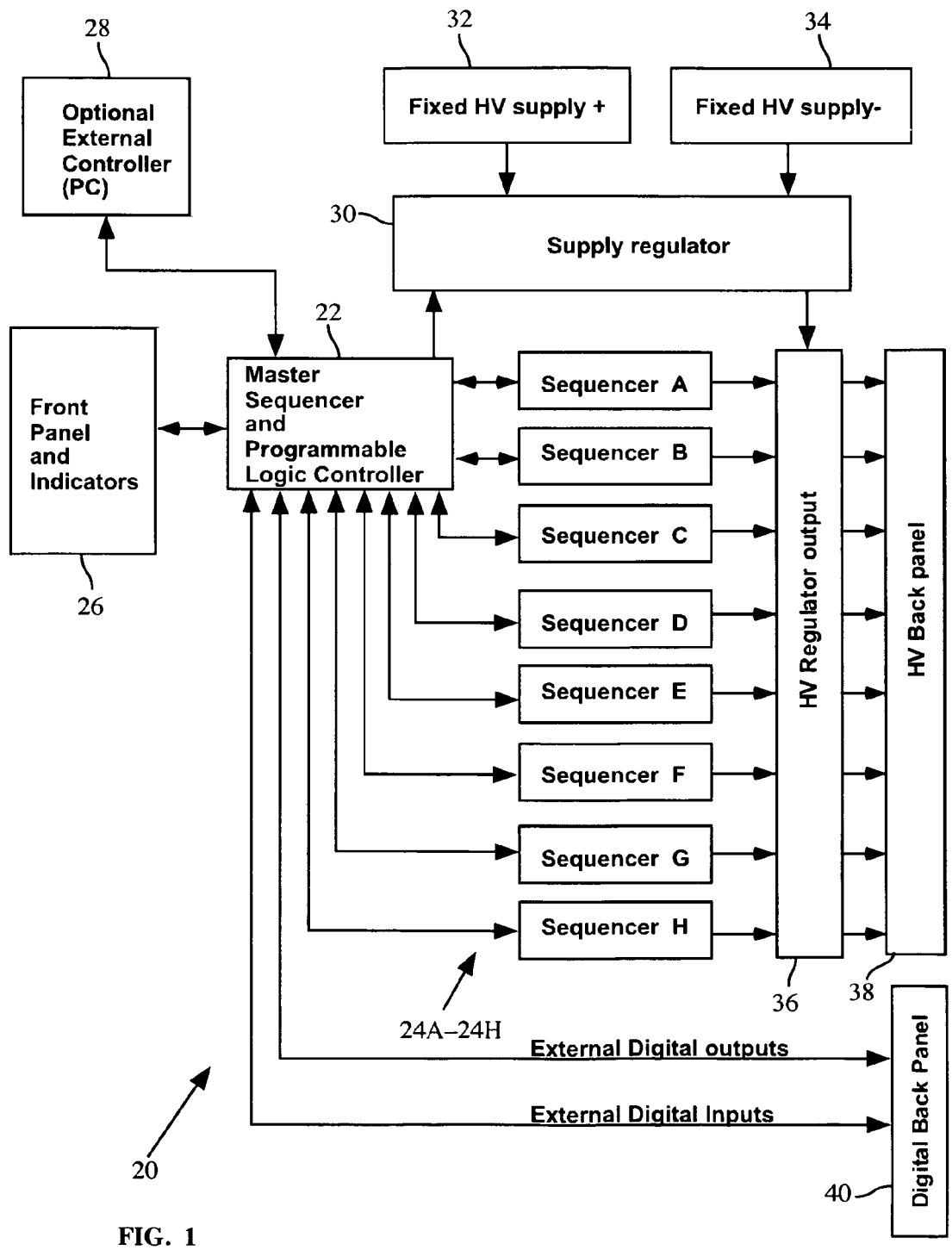
FIG. 1 is a block diagram of a high-voltage sequencer according to the invention showing a master sequencer and a programmable logic controller.

The following description of a preferred embodiment of the invention is not intended to be limiting. While a specific architecture and specific circuitry is presented to reduce the invention to practice, significant modifications of this architecture and circuitry are possible while retaining the essential nature of the invention: the sequenceable multiple-channel power supply. Specific part numbers and component values shown in the drawings are intended to be suggestive of representative components that may be used in practicing the invention.

FIG. 1 shows the system architecture. FIG. 1 shows a schematic diagram of the division of the functionality of a high-voltage sequencer 20 according to the invention by circuit board. This division has proven to be convenient for assembly and reasonably compact, but those skilled in the art can readily implement the invention using a variety of circuit-board arrangements. The present invention provides the ability to switch channels rapidly through different modes and settings, based on real-time calculations, measurements, or programmed sequences. The invention provides the flexibility and simplicity for creating sophisticated, adaptable, fault-tolerant active controls.

An example microfluidics experiment helps explain the flexibility and power of the invention. To control this experiment, one high voltage sequencer 20 according to the invention can automatically perform all of the following functions:

Detect a current dip as a cell passes through an orifice;
Convey the cell to a preparation chamber, then lock it in place
Flow labeling dyes into the chamber and lyse the cell;
Inject the labeled lysate into a column;
Fractionate the lysate into bands;
Power a photo-multiplier tube to detect fluorescence;
Trigger data recorders and cameras; and Flush the chamber, then await more cells.

From outputs to interlocks, the high voltage sequencer 20 goes far beyond the functions of a high voltage amplifier: it replaces an entire rack of uncoordinated high-voltage supplies, multimeters, cables and controls. Add the ability to switch between programs and reconfigure in seconds, and the high voltage sequencer 20 becomes the essential tool for electrophoresis, dielectrophoresis, pulsed field studies, microfluidics, electro-chromatography and lab-on-a-chip research.

The highest authority in this architecture is a master sequencer and programmable logic controller 22. The master sequencer and programmable logic controller 22 coordinates the functions of a plurality of sequencer channels 24A-24H, which control and monitor high voltage inputs/outputs. Unlike the channels, the master sequencer and programmable logic controller 22 does not control a high voltage output, nor does it trigger inputs and outputs.

In this implementation, the master sequencer and programmable logic controller 22 also serves as a digital communications server. The master sequencer and programmable logic controller 22 communicates with each sequencer channel 24A-24H and a front panel 26 through an I$^2$C bus and an external controller 28 through an asynchronous serial bus. An alternate architecture for these communications is for the front panel to communicate with the external controller and relay instructions to the master and channels over the I$^2$C bus.

The master sequencer and programmable logic controller 22 is connected to a supply regulator 30 to provide control signals thereto. The supply regulator 30 receives a fixed high positive voltage input from a fixed HV supply 32 and a fixed negative voltage input from a fixed HV supply 34. The supply regulator 30 provides voltage outputs to a high voltage regulator output circuit 36, which operates under the control of the sequencers 24A-24H to provide selected high voltage signals to a high voltage back panel circuit 38.

The high voltage sequencer 20 also includes a digital back panel circuit 40 that is connected to the master sequencer and programmable logic controller 22.

The high voltage sequencer 20 may be used in either a manual mode or an automated mode. In the manual mode, the high voltage sequencer 20 provides eight channels of high-voltage sourcing, sinking, and sensing, with control and monitoring from the software interface. In the automated mode the high voltage sequencer 20 may be used as follows:

1. Using the Sequence software, open an existing sequence file, or create a new file.
2. In Sequence, program the sequence and settings for each channel.
3. Store the properties and logic to the high voltage sequencer 20 memory.
4. Test the sequence by manually issuing control commands and examining the channel states, using the software, the high voltage sequencer 20 channel LEDs and/or a multimeter.
5. Plug the experimental equipment to the high voltage sequencer 20 and run a selected experiment using the high voltage sequencer 20 or the external computer 28.

In a preferred embodiment the high voltage sequencer 20 includes eight high-voltage channels, 24A-24H each of which can switch in a millisecond between several functions such as supplying voltage with 50 mV resolution, while monitoring current with 100 nA resolution; supplying current with 100 nA resolution, while monitoring voltage with 50 mV resolution and functioning as a high-voltage voltmeter with 100 M-Ohm input impedance.

The invention includes sequence software, which is a powerful programming environment that provides the capability of automatically setting the functions and parameters of each channel. The set of automation commands is called a sequence, which is constructed from programs that control particular events. Each channel runs its own independent sequence. Several methods of inter-channel communications allow the channels to communicate changes in state, and to respond to external events. The settings and programming for a particular experiment can be stored as a sequence file on the external computer 28. Once all the settings for a sequence file, have been programmed, those details are transferred and stored to the memory of the high voltage sequencer 20. The high voltage sequencer 20 can then operate in a selected experimental environment with or without an attached computer.

The master sequencer and programmable logic controller 22 and sequencer channels 24A-24H execute independent sequences in parallel. A sequence is a set of automated commands grouped into programs. Programs comprise individual instructions. While the master sequencer and programmable logic controller 22 and sequencer channels 24A-24H run independent sequences, they can also communicate via three methods:

1. Step instructions let all channels jump simultaneously to defined points in their sequences;
2. Flags, which are variables that can be set, cleared and/or read by any channels; and
3. Trigger signals, which let a particular channel respond to a combination of internal or external events.

When a sequence is running, it will automatically change channel functions and settings. At the same time, manual changes can be made through the Channel settings and Power Supply control panel. Say, for example, an event is to occur when Channel A reaches some yet-unknown voltage level. The HVS provides the capability to manually adjust that voltage at the appropriate time so that the unknown level can be determined. Once a sequence starts running, the channel states will change automatically. These changes will not be visible on the Channel control panels or the Power Supply Control Panel; the monitored channel values will continue to be updated, however.

In all but the simplest controls, sequencer channels must be able to influence other channels, for example, to signal an over-current condition or to move to a new step in the sequence. The invention provides interchannel communication for this purpose. There are three mechanisms of inter-channel communications: step instructions, flags, and triggers. Step instructions are used to switch between conceptual portions of a sequence, when multiple channels must react simultaneously. Flags are used for general purpose signaling among channels. Flags can be assigned different meanings by the user at different times within a step. Triggers are used to communicate with external equipment, to create "protected" communication pathways between channels, and to facilitate complicated signaling logic. Trigger logic can be different for different steps, but is constant during a step.

Step instructions are interrupts which force the master and channel sequences to jump from their current programs to a prescribed one-instruction step program. Step instructions should be used where there is a clearly defined change that affects multiple channels—for example, switching from an "initialization" step to a "run" step. A one-instruction step program will include a Continue, Run or Exit instruction.

The Continue instruction resumes the program that was running before the Step instruction.

The Run instruction jumps immediately to a global program label. In the example: Run Initialize, on switching to this step, the program "Initialize" will be run.

It is good programming practice to use the "Run" instruction at least once for any step that is to be run by a user command for clarity, even when it is not necessary.

Any channel 24A-24H, or the master sequencer and programmable logic controller 22, can force a step change at any time by executing a "SwitchTo Step" instruction. All channels must then switch to the prescribed Step at the end of their current instruction, regardless of current activity.

There is no way for any of the channels 24A-24H to ignore a step change. However, by using the "Continue" Step instruction a channel will resume execution, ignoring the step change.

It should be noted that it is possible to also manually execute a Step instruction during an automated sequence, by choosing Actions>Run>Step A-H, or by selecting it on the Sequence Control Panel.

The Exit instruction causes the channel to stop running programs and makes the channels inputs.

Though any sequence can perform a Step instruction, it is important for orderly step flow that one sequence channel or the master retains authority over step instructions at any given time. Otherwise, multiple sequences may send simultaneous (and inconsistent) Step instructions, which could quickly lead to chaos.

A simple solution is to program only the Master sequence to issue Step instructions. While this approach does help ensure orderly movement between steps, it does not work universally, such as when different channels must switch steps in response to measurements. Whatever the requirements, it is best to keep the step switching simple.

The Exit Step H is reserved for ensuring a safe shutdown of the sequence. When a channel executes an "Exit" instruction, it switches the sequencer to Step H and does not allow any other step switches until the master sequencer terminates the program by issuing its own "Exit" instruction (see the "Exit instruction." If any special shutdown procedures are required by a channel, they should be run in Step H. The default step instruction of the Master for StepH is "Exit," causing the sequence to exit immediately at StepH. Thus, by default only, a SwitchTo StepH instruction has the effect of terminating a sequence.

Flags are useful for coordinating program flow within a step. The master or channels can "set" and "release" the four flags, F1 through F4, and the flags can have different meanings at different points in a sequence. Unlike step instructions, flags do not automatically produce a particular behavior; instead, individual channels can react to, or ignore, the flags.

For example, if two channels are to produce out-of-phase square waves during a step, the channels could coordinate their voltage-switching times by the use of a flag. Other channels would go about their business ignoring, watching, or manipulating this flag as desired.

The master or channels set and release flags by the instructions "SetFlag X" and "ClearFlag X," where X=F1, F2, F3, or F4. The state of the flag can be read by the conditional statements, "FlagSet? X" or "FlagClear? X," again where X is F1, F2, F3, F4. If the test is true, the next instruction will be executed; if the test is false, the next instruction will be skipped.

If two or more channels set a flag, and one releases the flag, the flag remains set. A flag is only cleared when all channels that have set it have also released it.

Triggers are used for communication with external equipment, or when a compound condition is required to "trigger" an event in a channel sequence. A Trigger is specific to a channel, whereas any channel can set or release a flag. To use a trigger, one first describes a logical condition that will set the trigger. This happens at the Sequence level, following a Step Instruction. Then, within the body of a program, a test is done to determine whether the trigger is set.

Four BNC inputs, IN1 through IN4, accept external trigger signals. These inputs are normally high, which represents a logical FALSE trigger value. Tying an input's voltage low sets the trigger value to a logical 1, or TRUE.

Each channel has a trigger output. The outputs of channels A, B, C, and D are connected to the back-panel BNC connectors labeled OUTA, OUTB, OUTC, and OUTD, respectively, allowing these channels to trigger external apparatus.

Each channel also has a trigger input, which you can program to be any logical comparison of signals from IN1 through IN4 and/or outA through outH. The default trigger logic for a channel input is trigger=FALSE, which means, "the channel's trigger will never be set." Trigger logic can be more complex, as in trigger=OUTB and not IN1, which means, "this channel's trigger will be set if Channel B sets its trigger output while input IN1 is FALSE."

Trigger logic can be different for each sequence step:
StepA: Run Initialize;
trigger=FALSE; //the trigger is never set during StepA
StepB: Continue;
trigger=IN1; //the channel can be triggered off the external input IN1, during StepB A definition of trigger logic for a channel in Step A does not automatically carry over to Steps B and C. Those steps will retain the default trigger logic until they are changed.

Triggers isolate communication channels in a way that is not possible with flags, reducing the potential for software bugs. For example, the earlier example of coordinating channels to make complementary square waves may be better implemented using triggers rather than flags. Then another channel cannot accidentally change the coordination of the channels by setting the flag.

The trigger condition for the master sequence is set to trigger=outGND, which is always a logical TRUE. Unlike the channels, the logic for the master cannot be changed. The Master can only be triggered via a Force Trigger—press "Trigger", then "ALL" on the HVS front panel, or click the Master "Force Trigger" button in the Sequence Control Panel.

The trigger output of a channel can be set or cleared using the instructions "Output Set" and "Output Clear." The trigger input state can be tested using the commands "InputSet?" and "InputClear?" If the condition is true, the next instruction will be executed; if it is false, the next instruction will be skipped.

In this implementation, the master sequencer also serves as a digital communications server. It communicates with each sequencer channel and the front panel through an I$^2$C bus and the external controller through an asynchronous serial bus. An alternate architecture for these communications is for the front panel to communicate with the external controller and relay instructions to the master and channels over the 12-channel bus. The architecture of such digital communications is well known to those skilled in the art.

Figure 2J:
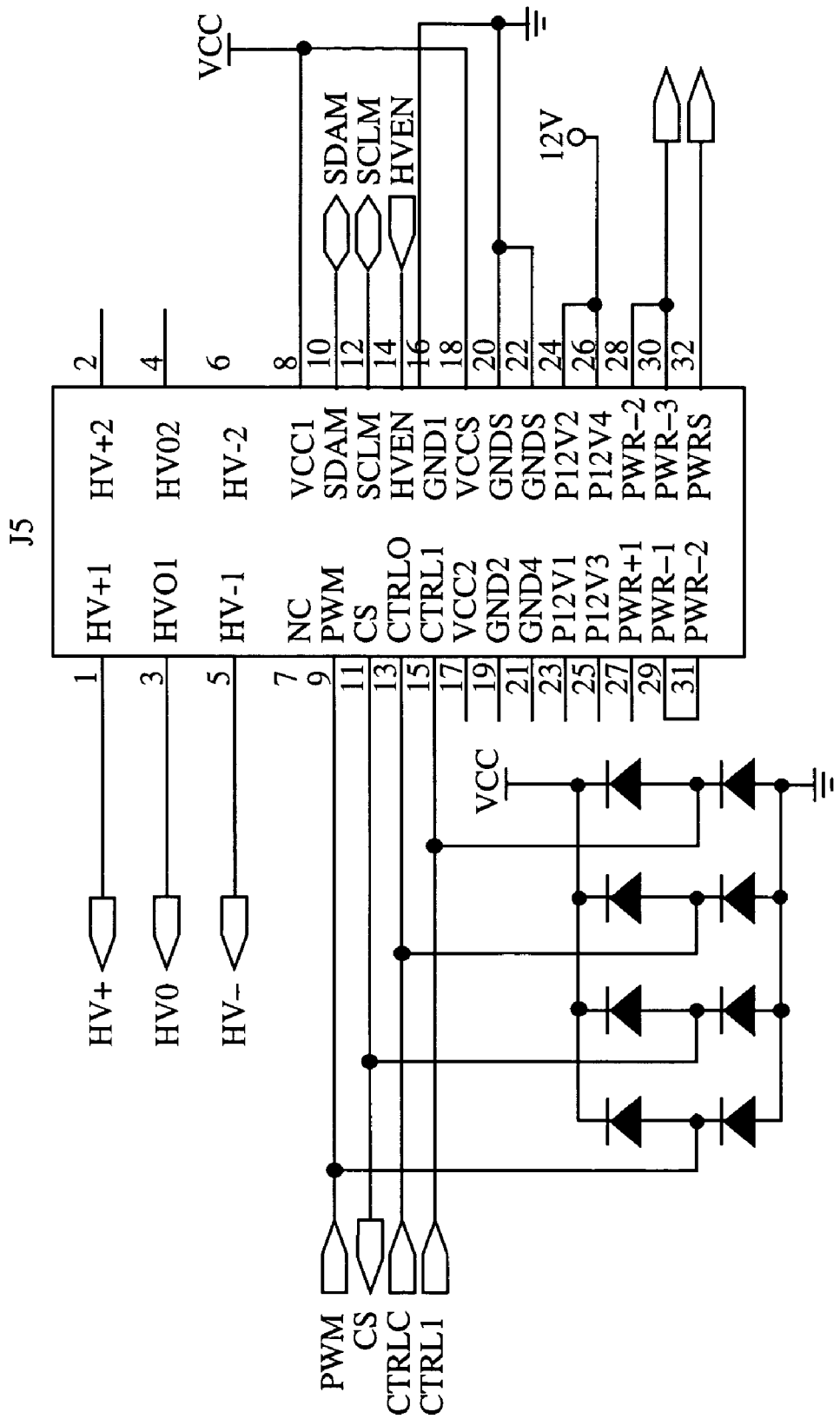
FIGS. 2A-2N are diagrams of the progranirnable logic controller and associated digital input/output subcircuits.
Figure 3A:
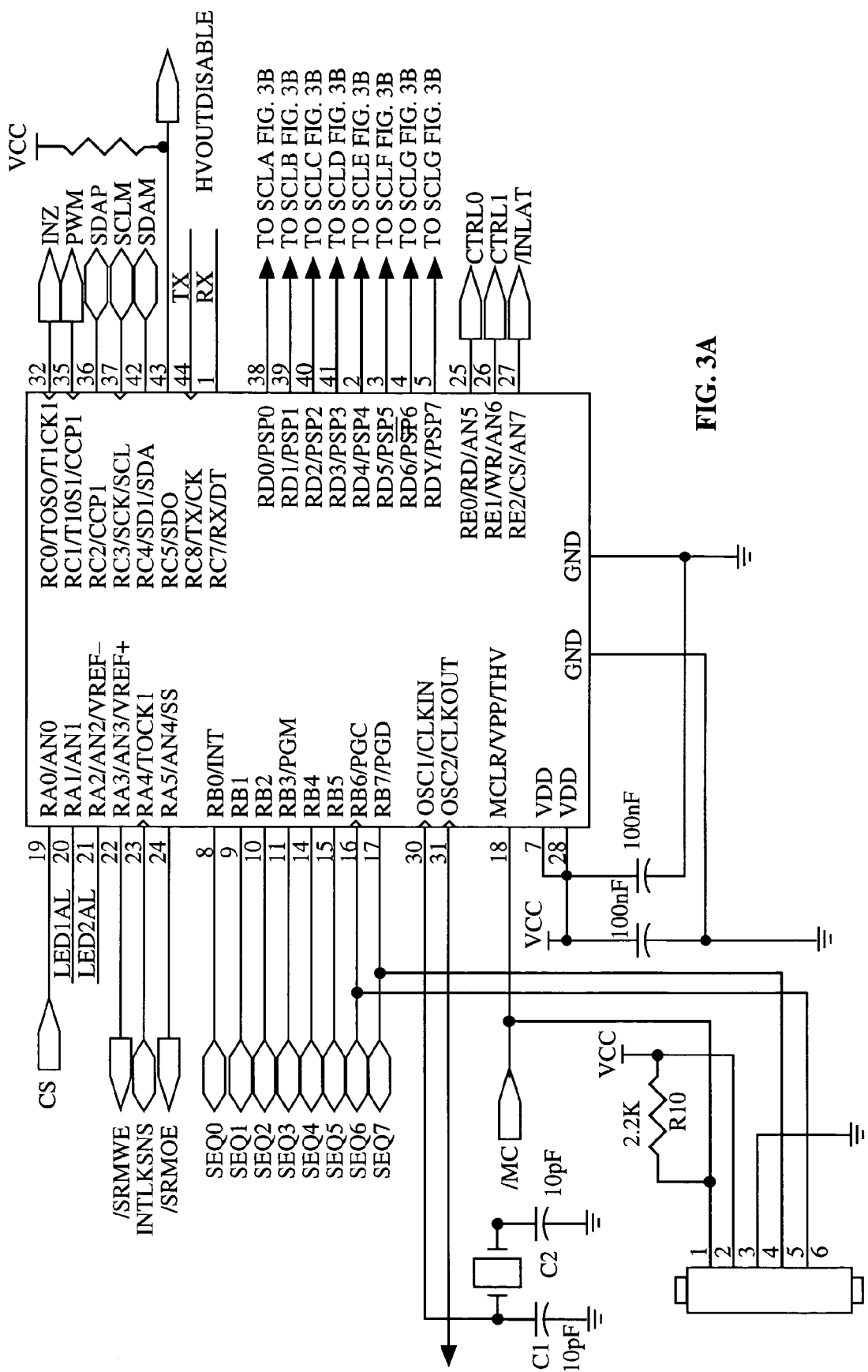
FIGS. 3A-3F schematically illustrate ciacuitry of the master sequencer, a front-panel interface, and a communications subcircuit that may be included in the invention.
Figure 3B:
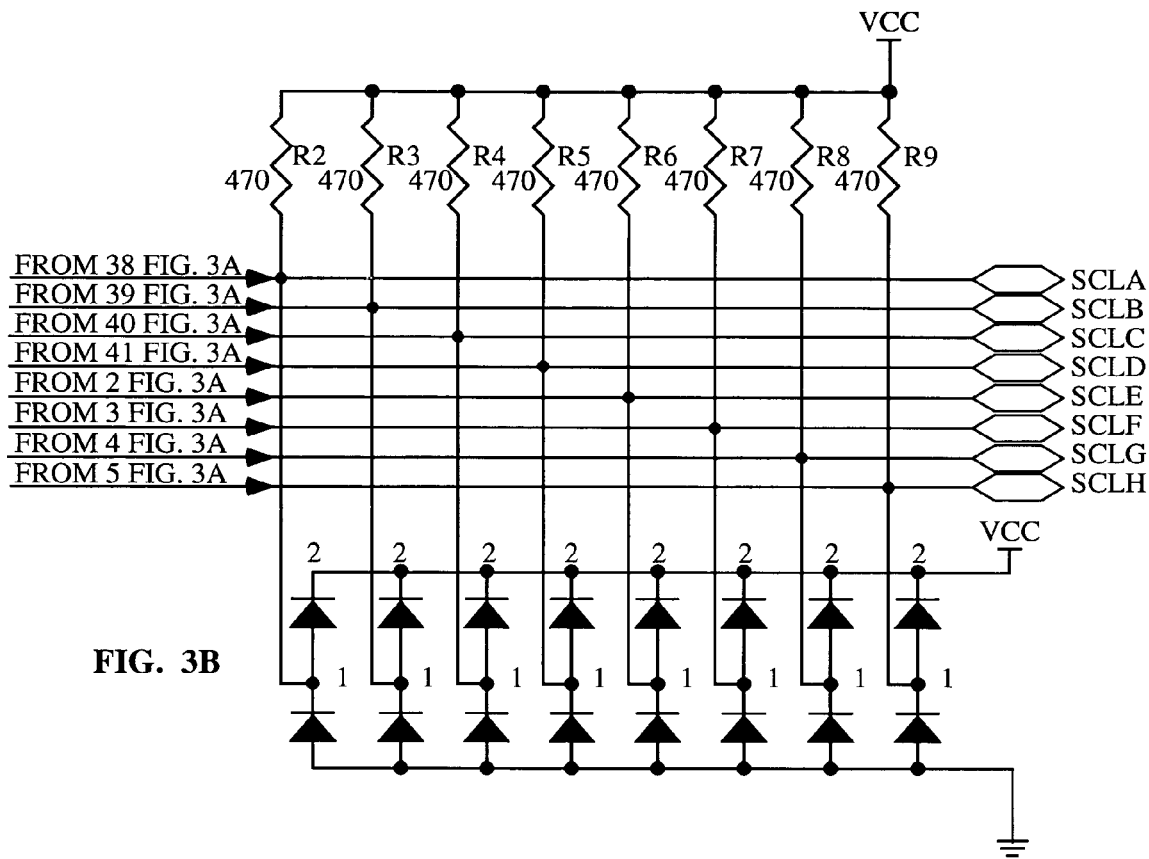
Figure 3C:
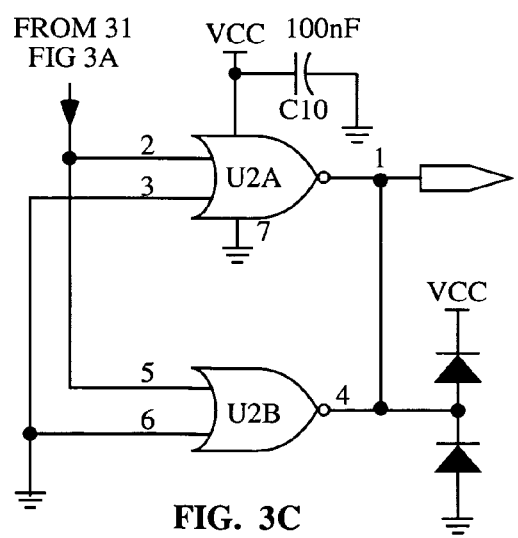
Figure 3D:
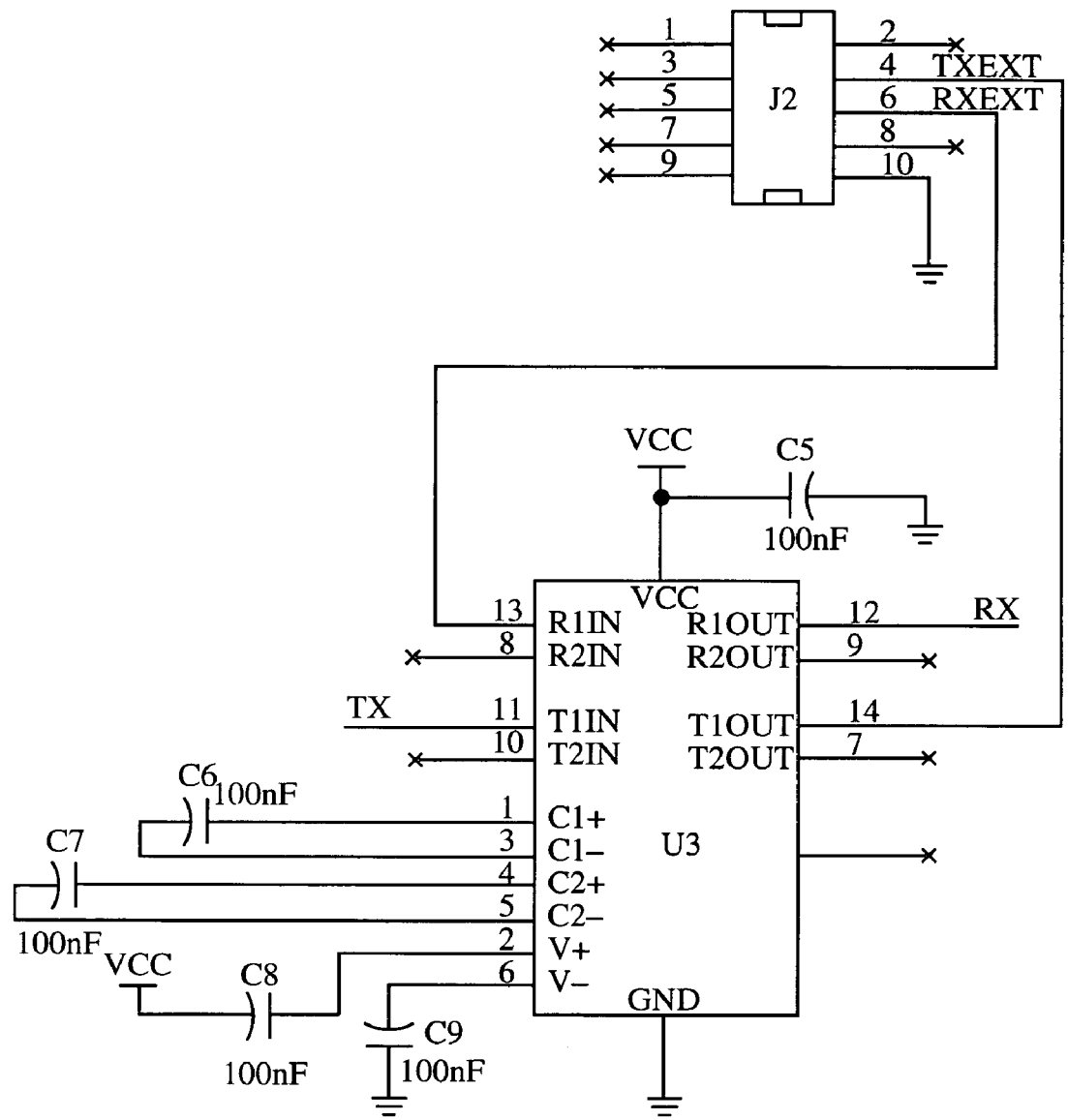
Figure 3E:
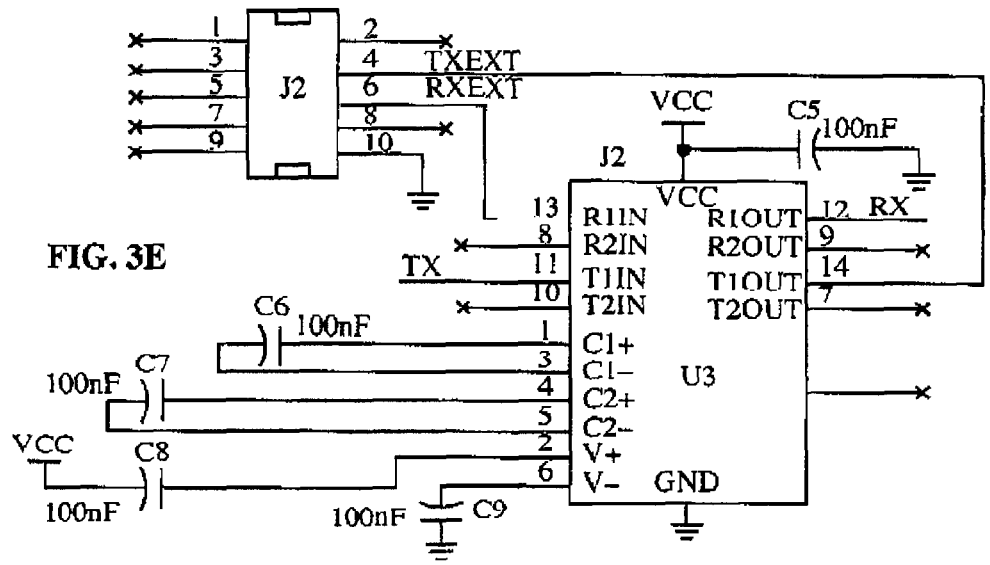
Figure 3F:
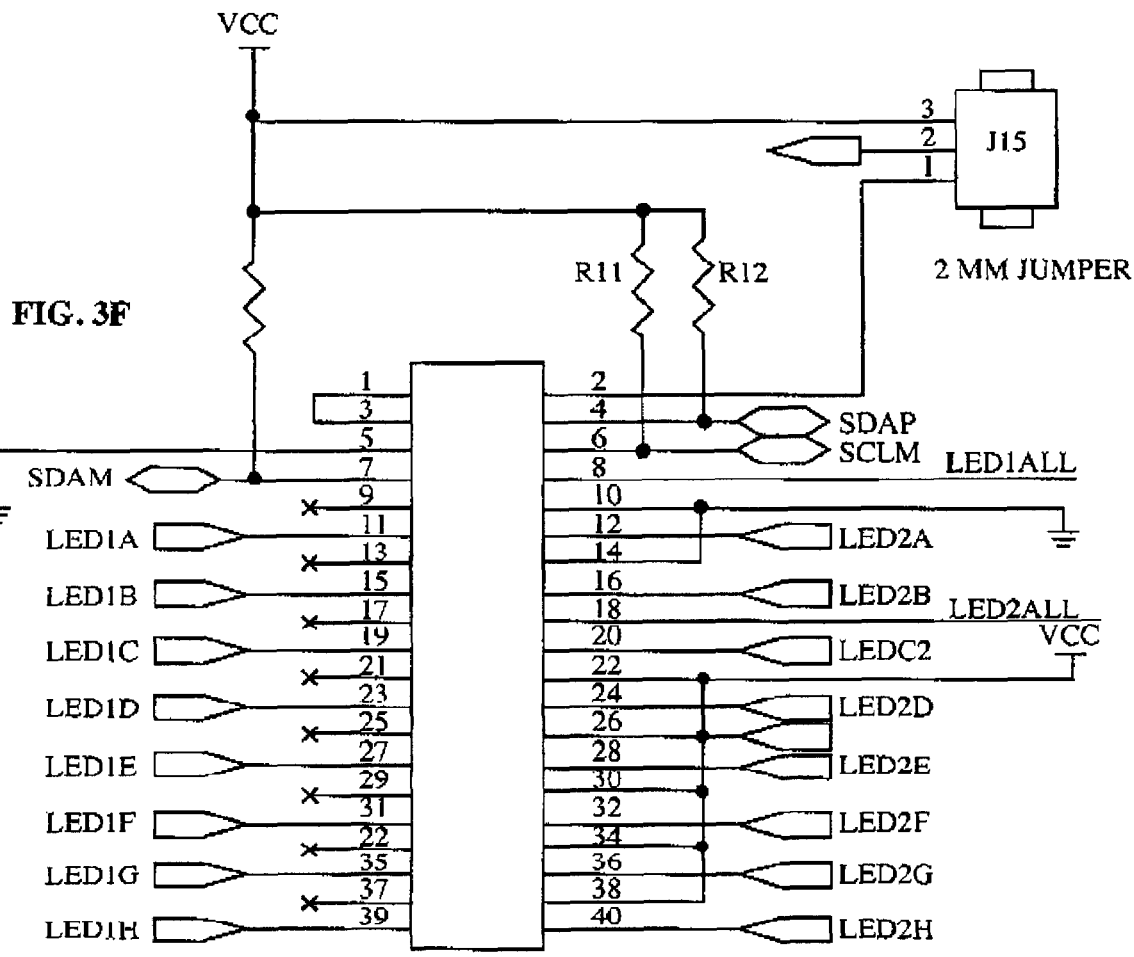
Figure 4A:
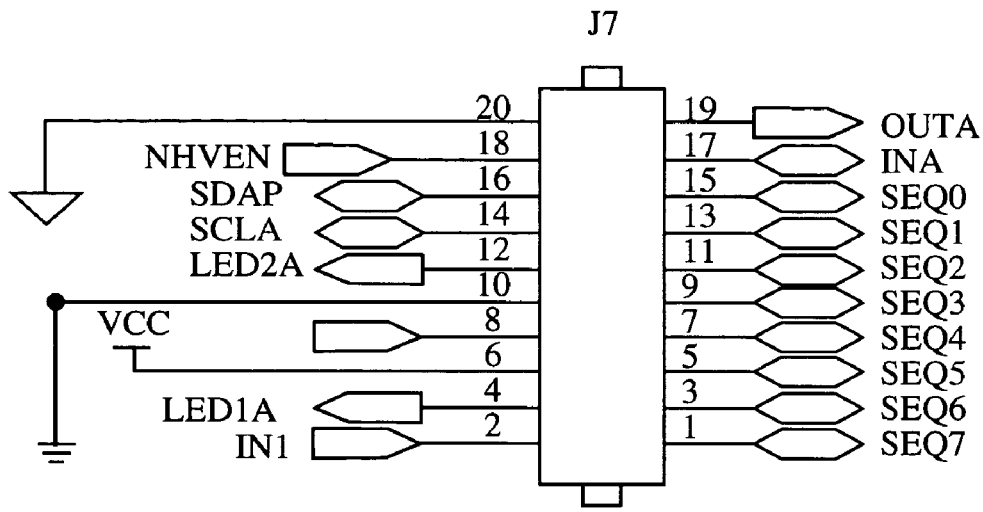
FIGS. 4A-4E schematically illustrate connections to high voltage sequencer daughterboards that may be included in the invention.
Figure 4B:
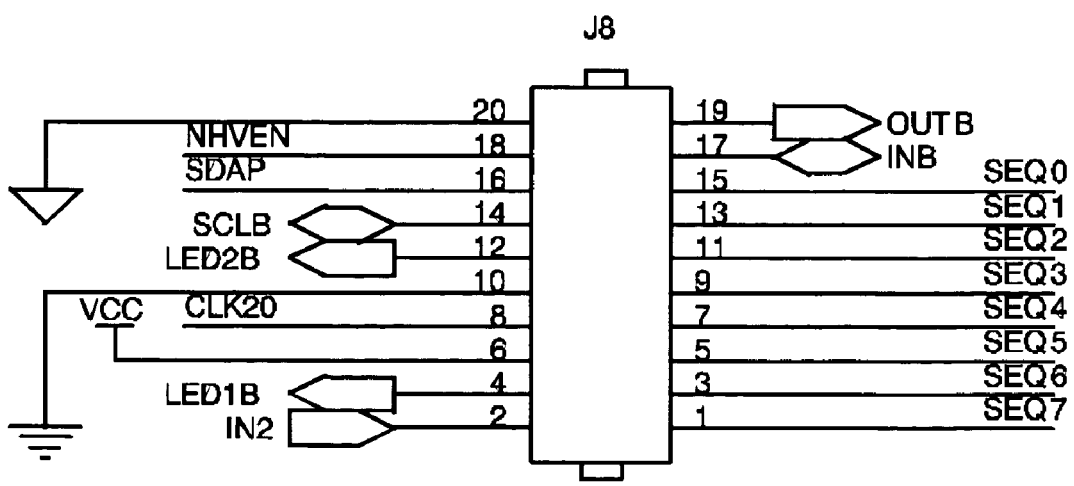
Figure 4C:
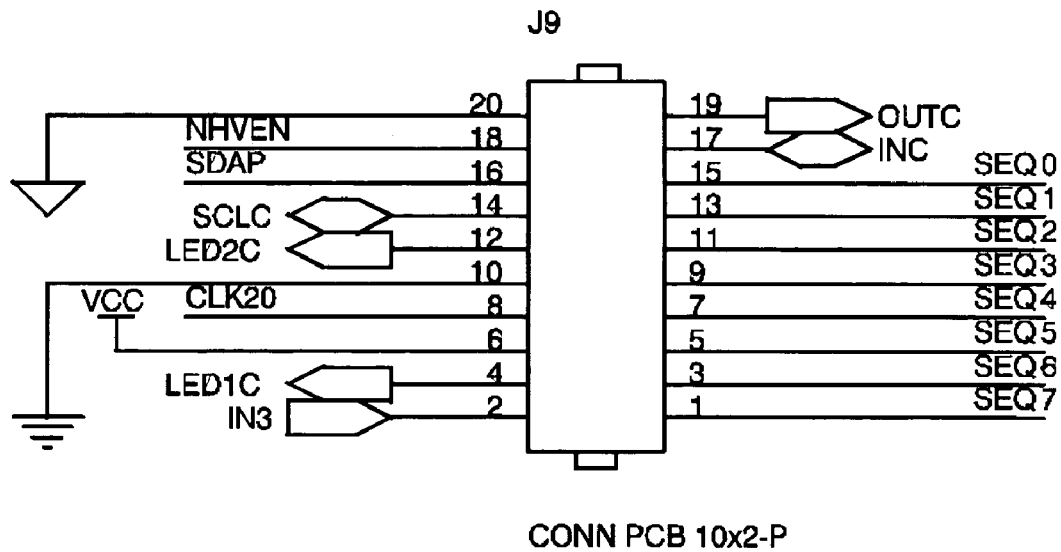
Figure 4D:
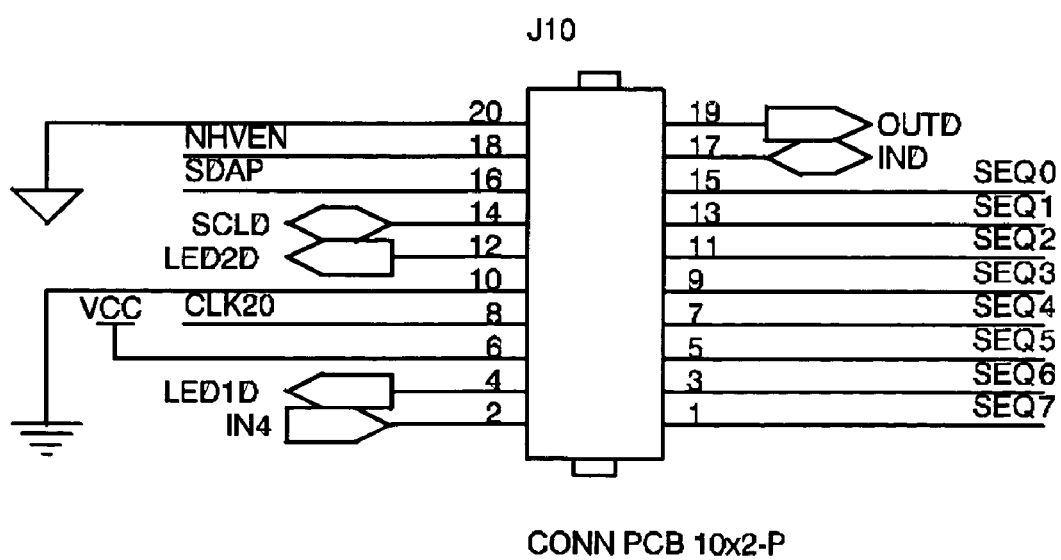
Figure 4E:
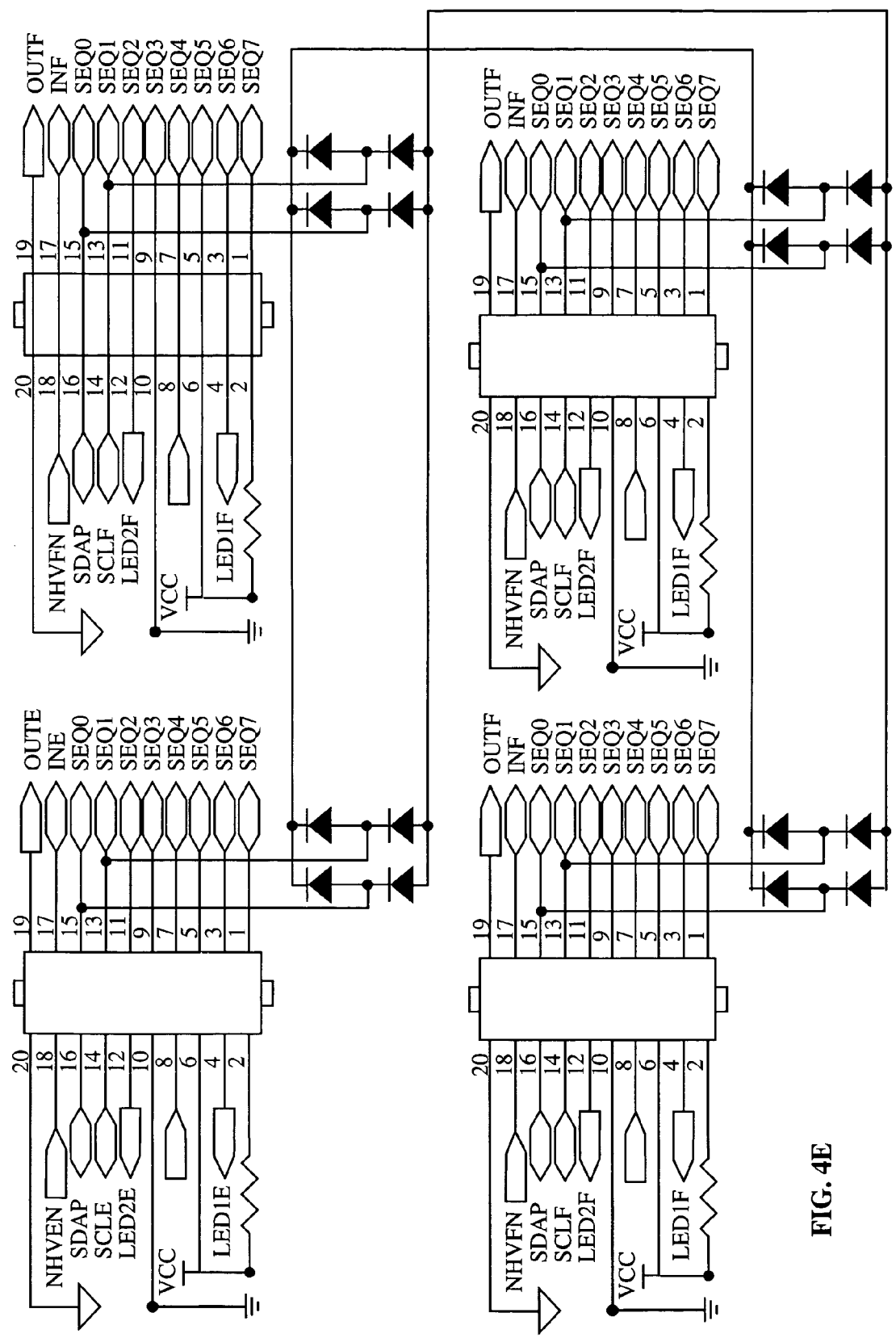

FIGS. 2A-2N show schematic diagrams of the master sequencer and programmable logic controller 22 and associated communications circuitry of the motherboard. The controller in this embodiment is preferably an 8-bit microcontroller U4 shown in FIG. 2M. Communications with the external controller 28 is via an asynchronous serial port. The microcontroller U4 is preferably operated at a clock frequency of 20.48 MHz so that the number of clock pulses in one time unit of the sequencer, 0.1 ms, is an exact power of two. This clock signal is buffered and distributed among all the sequencer channels as will be described.

In FIGS. 2A-2J the blocks labeled INPROT and OUTPROT are, respectively, simple electrostatic-discharge (ESD) and over-voltage digital input and output protection subcircuits well known to those skilled in the art.

FIGS. 3A-3F schematically illustrate the input and output circuitry on the motherboard and the programmable logic circuit. The connector J3 attaches via a 40-pin ribbon cable to the front panel 26, which contains an array of indicator LEDs that are controlled directly by the sequencer channels and master. The front panel 26 also contains push buttons for controlling common functions.

The programmable logic is implemented using a fast SRAM (U5). An interlock circuit in FIG. 3A disables power to the high voltage power supplies when the interlock is not satisfied by switching off a logic signal that closes a relay on the Supply Regulator board that supplies power to the high-voltage power supplies. By hardware design, the microcontroller U4 can force the high-voltage power supplies to turn off by pulling the INTLKSNS net low, but cannot override a failed interlock. A fixed high-voltage supply control daughterboard plugs into connector J5 to regulate the output supplies to an accurate fixed value. This value is used during the field recalibration procedure to calibrate the voltage measurements from the channels.

The high-voltage sequencer channels are implemented as an array of daughter boards as shown in FIGS. 4A-4E. All the low-voltage power, clock, signaling, and indicator signals used by the sequencer daughterboards pass through these connectors shown in FIGS. 4A-4E.

Figure 5:
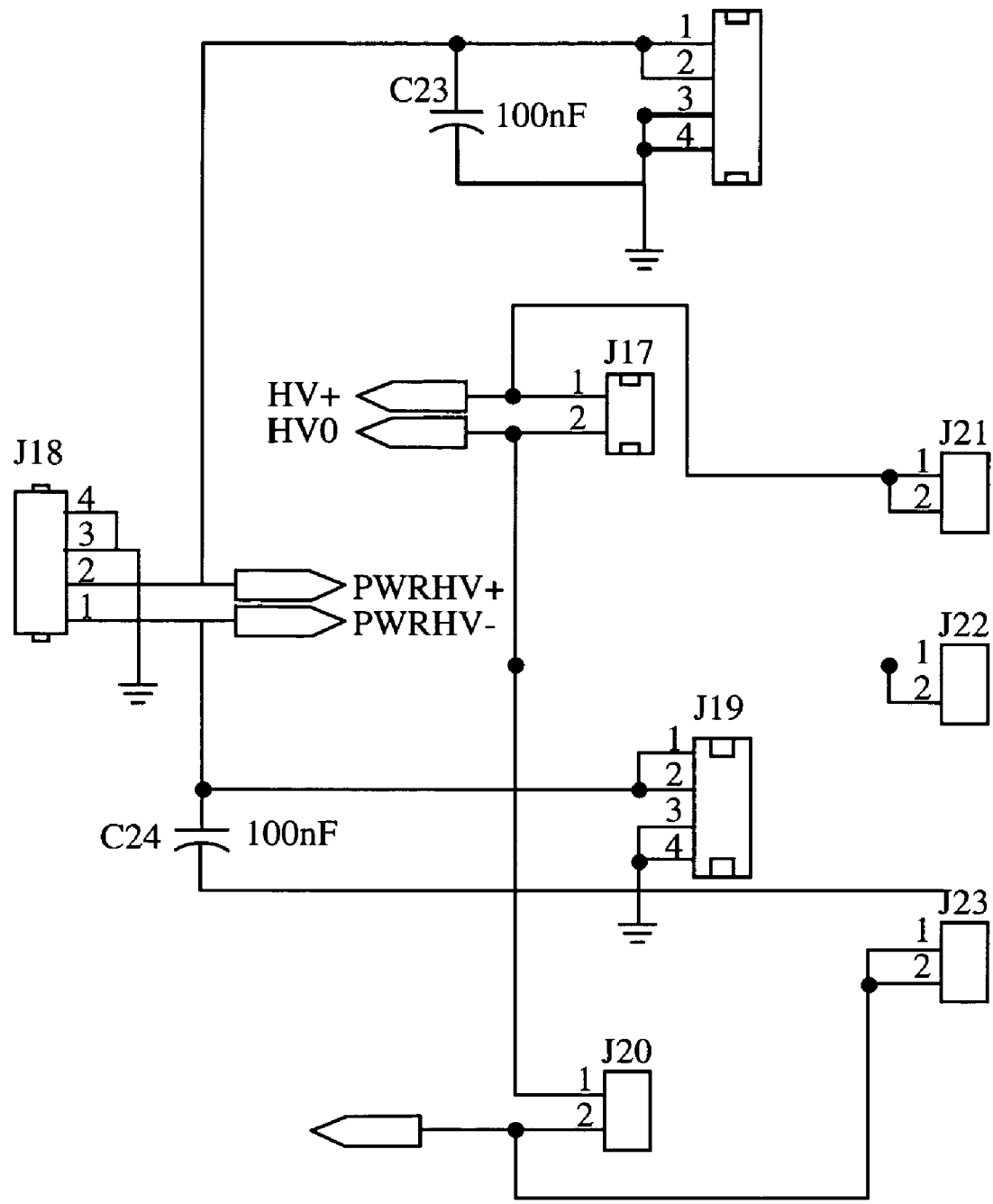
FIG. 5 schematically illustrates connections to a fixed high-voltage power supply that may be included in the invention as shown in FIG. 1

FIG. 5 is a schematic illustration of the connections to the fixed high-voltage power supply. This circuitry appears on the motherboard for convenience of assembly. For convenience in assembly, the circuitry to interface to the fixed high-voltage power supplies 32 and 34 is located on the motherboard and is as shown in FIG. 5. Connectors J21, J22, and J23 allow the use of wire-connected fixed high-voltage supplies and provide a convenient site to monitor the output of the power supplies during calibration. Connector J18 would be used to power such a high-voltage supply. Normally the power and the high voltage output employ connectors J16, J17, J19, and J20 that support convenient connections to a fixed high-voltage power supply module.

Figure 6A:
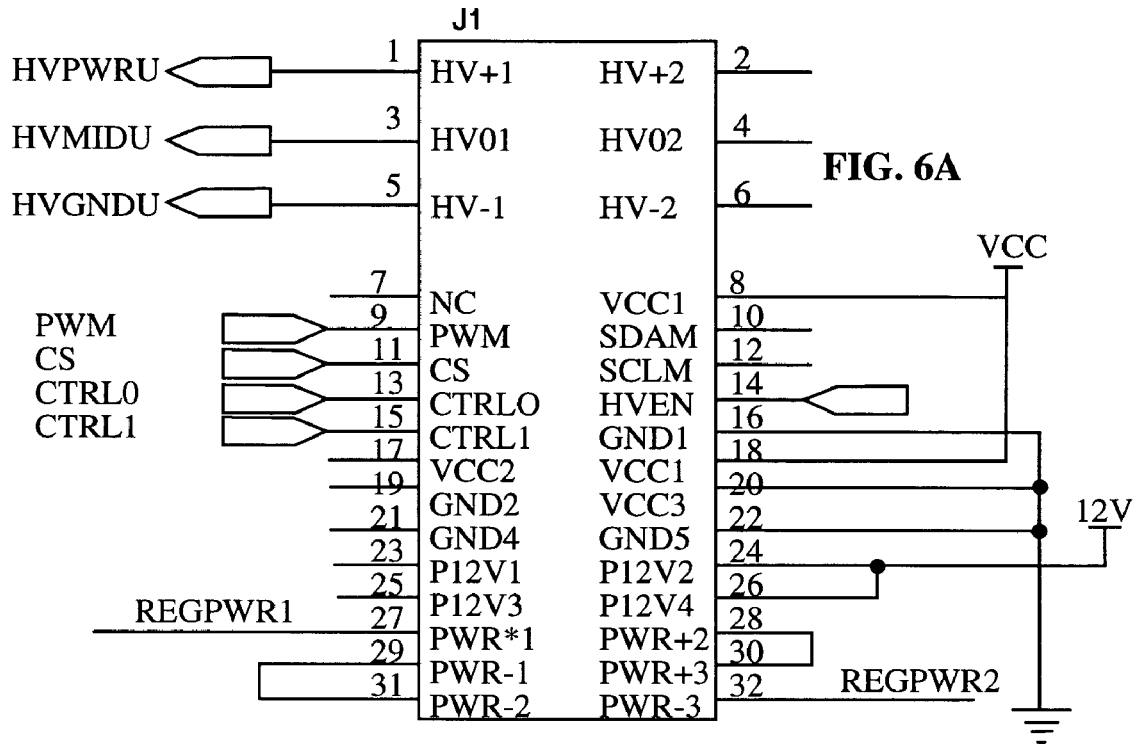
FIGS. 6A-6D schematically illustrate circuitry that may be included in a fixed-power-supply regulator daughterboard that may be included in the invention.
Figure 6B:
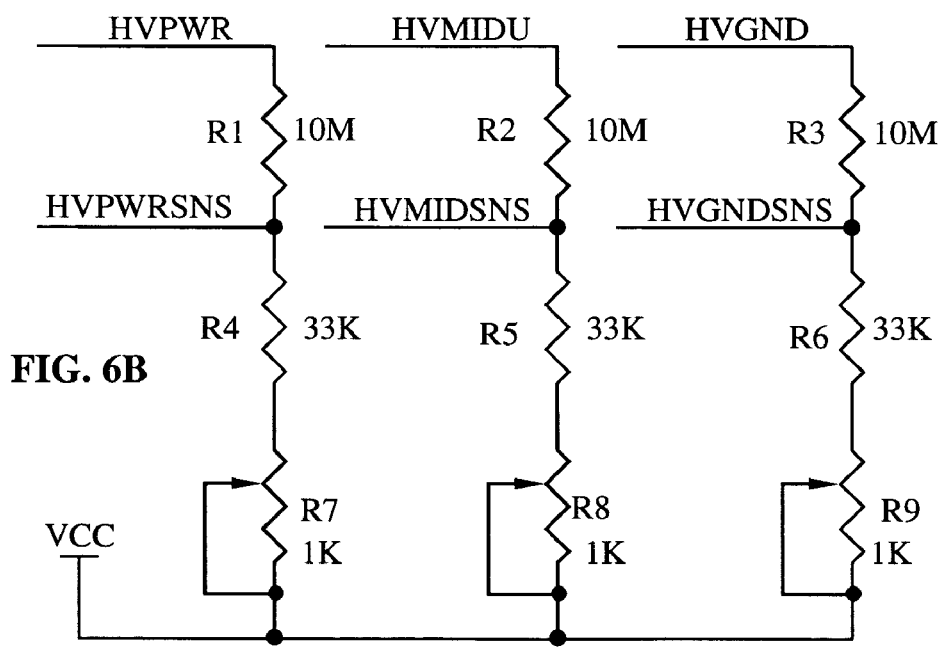
Figure 6C:
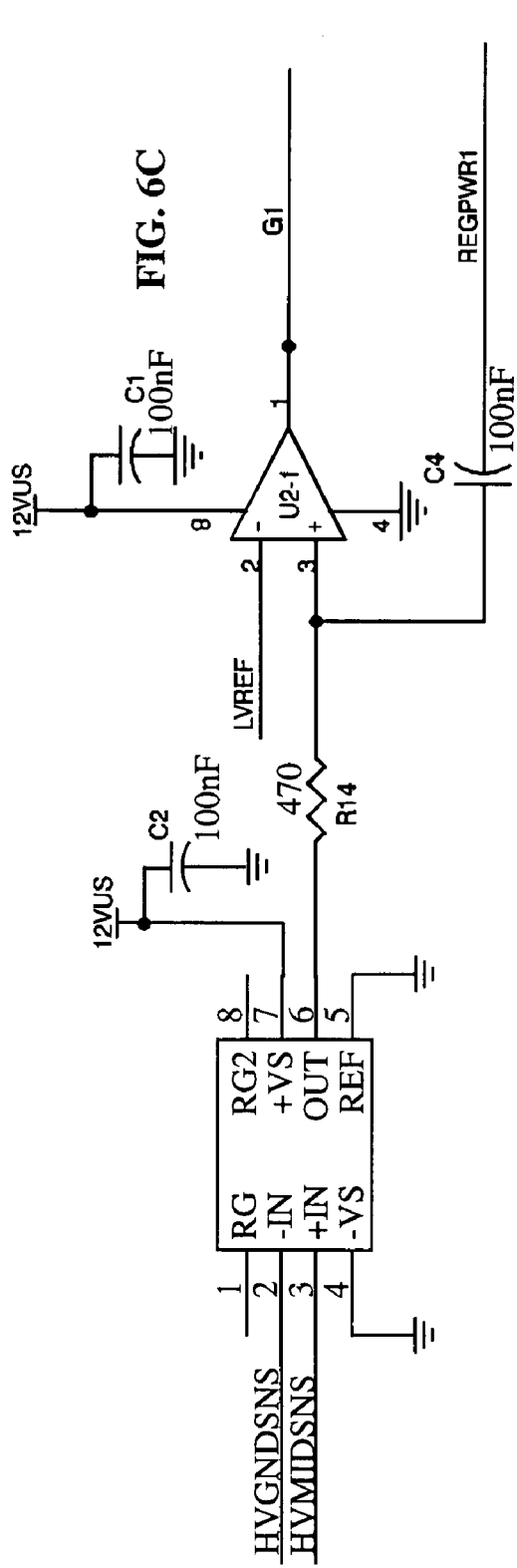
Figure 6D:
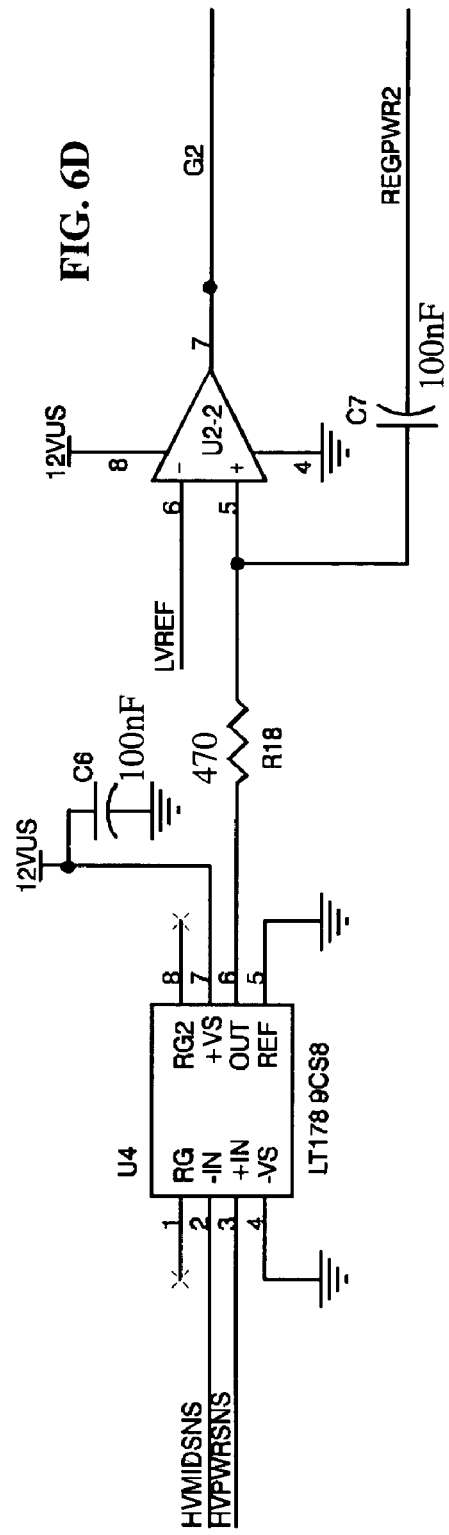
Figure 7A:
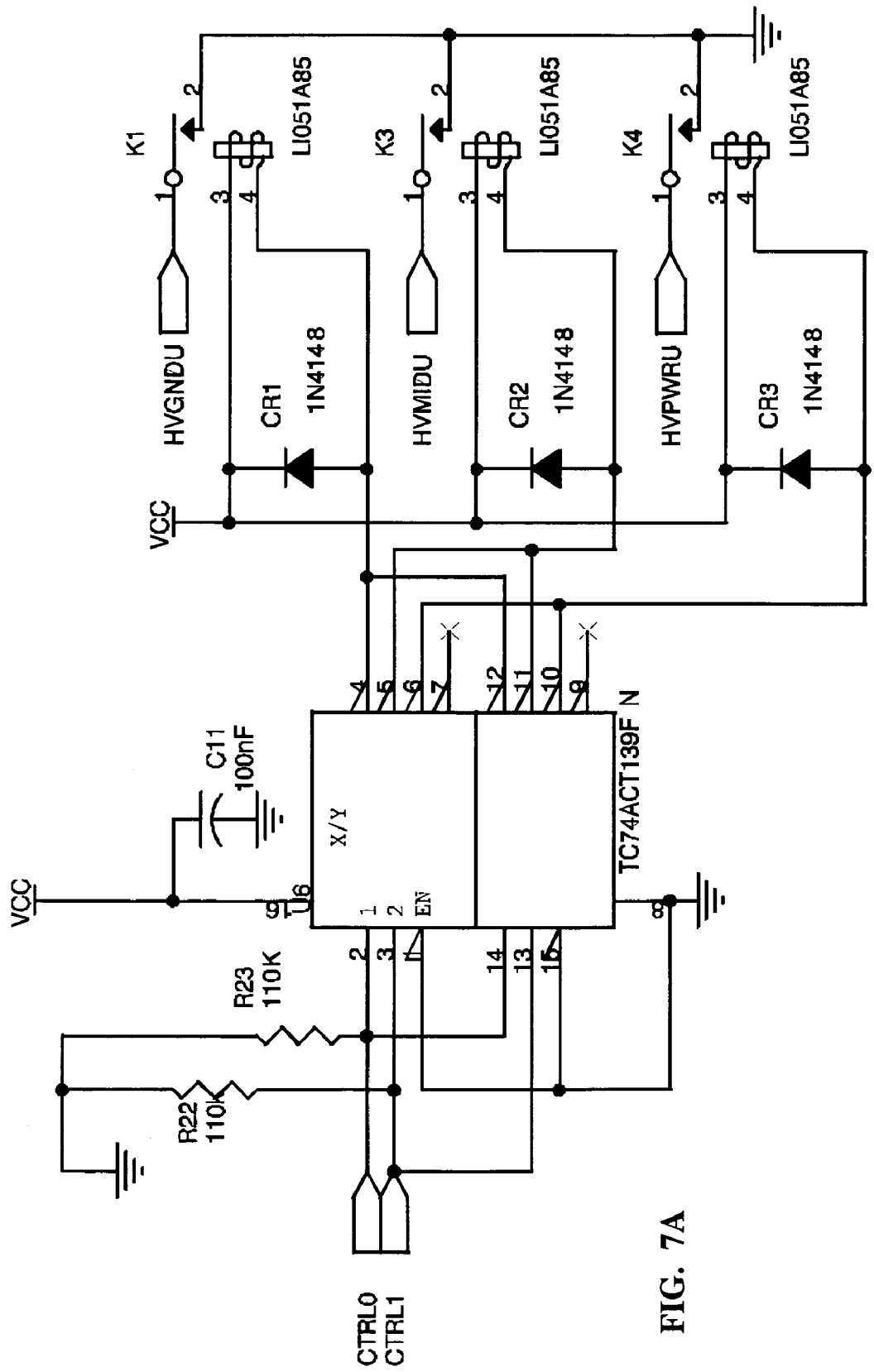
FIGS. 7A-7B schematically illustrate output range selection relays and high-voltage-enable relays that may be included in the invention.
Figure 7B:
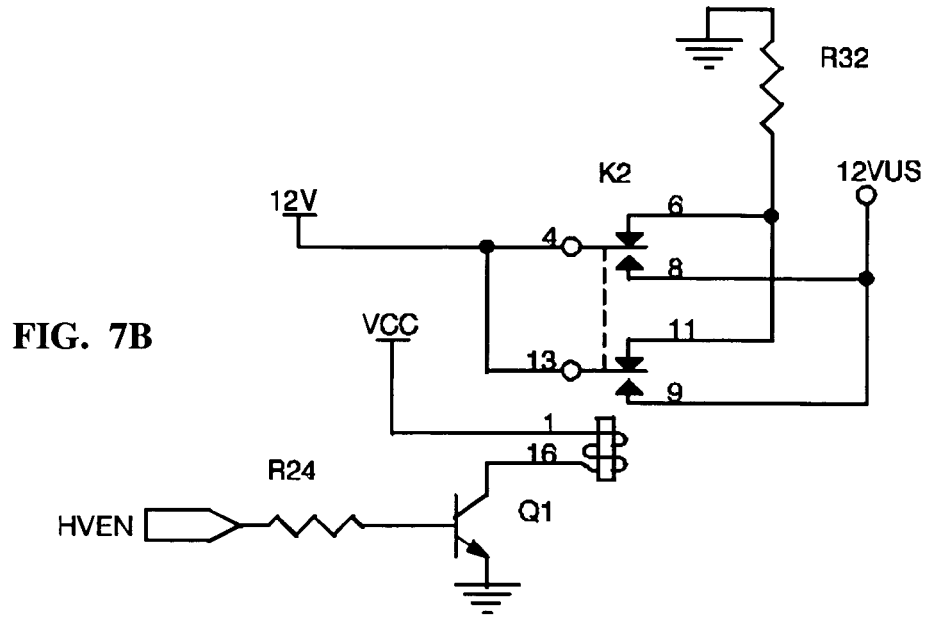

The design of the fixed-power-supply regulator daughterboard is shown in FIGS. 6A-6D, 7A and 7B. As shown in FIGS. 6C and 6D, two separate high-voltage power supplies whose output voltages increase with drive voltage are independently regulated using resistive voltage dividers into a rail-to-rail instrumentation amplifier, a precision 2.5 V reference, and an operational amplifier that drives a P-channel MOSFET. Low-drift, multiple-turn potentiometers K3 and K4 (FIG. 7A) allow the regulated output voltage to be factory calibrated. A secondary circuit allows the master controller to adjust this calibration value slightly during operation.

The master sequencer and programmable logic controller 22 selects the voltage range (positive, bi-polar, or negative) by setting the logic levels of CTRL0 and CTRL1. The high-voltage supplies are connected in series. If the positive voltage range is selected, a reed relay connects the most negative terminal of the power supplies to ground; if the bipolar range is selected, another reed relay connects the middle terminal to ground; if the negative range is selected, a third reed relay connects the most positive terminal to ground. The logic circuit is arranged to ensure that only one relay at a time is closed, to avoid short circuits. The HVEN logic line drives a transistor switch that drives a low-voltage power relay to provide power to the high-voltage supplies. As described previously, this line is low (high voltage disabled) whenever the interlock is not satisfied or the master controller forces the line low.

Figure 8A:
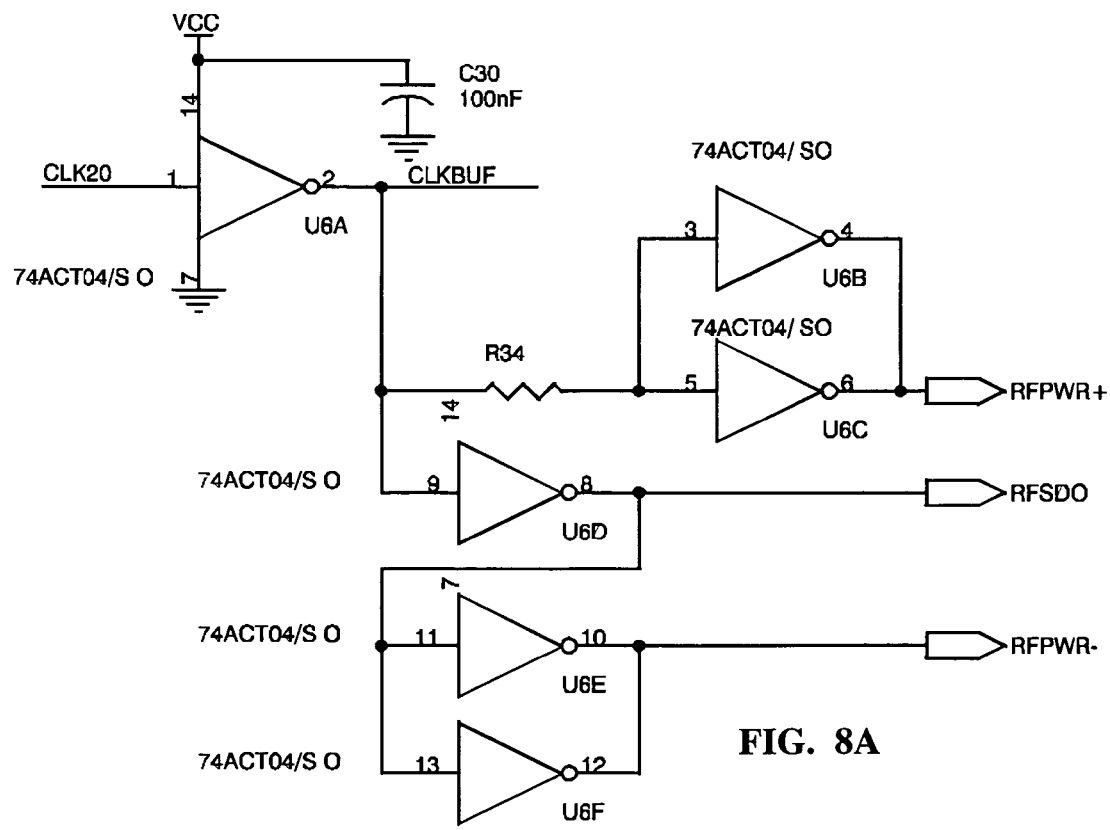
FIGS. 8A-8G schematically illustrate a high voltage sequencer controller subcircuit that may be included in the invention.
Figure 8B:
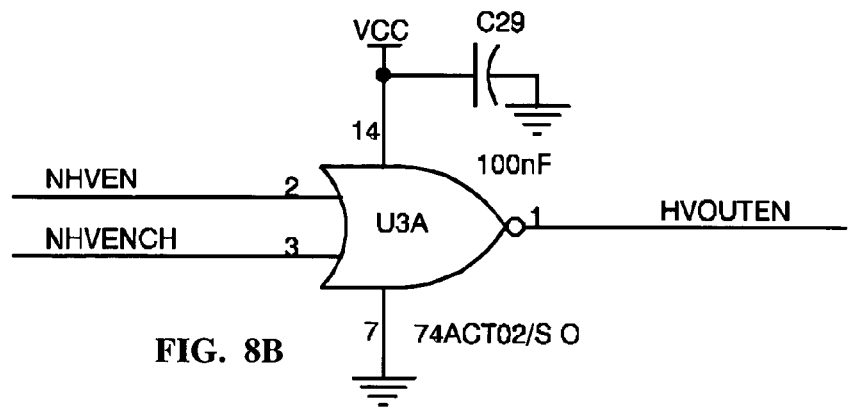
Figure 8C:
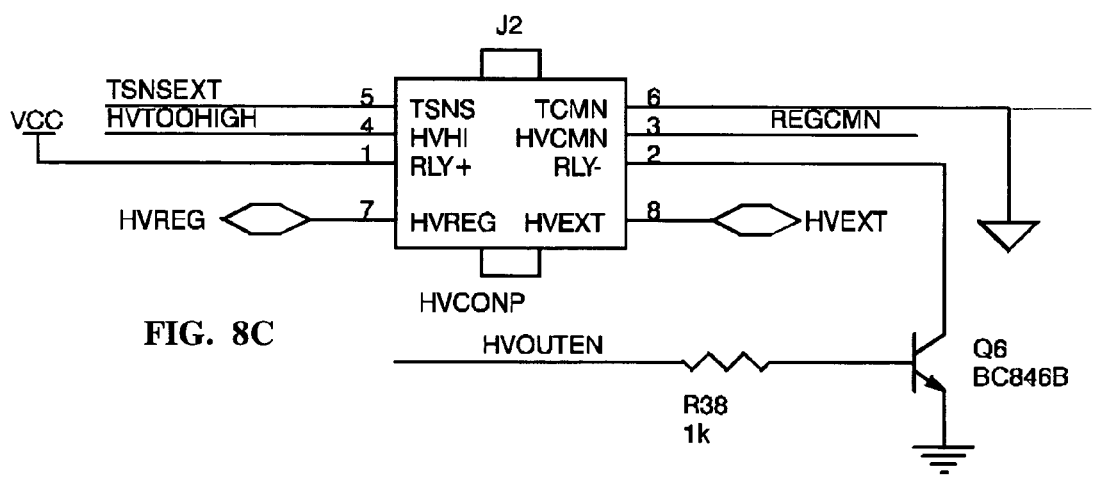
Figure 8D:
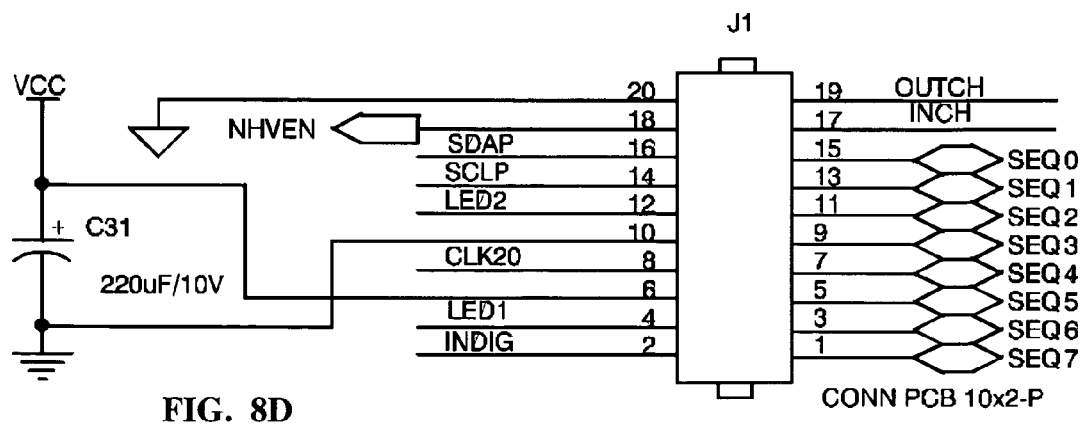
Figure 8E:
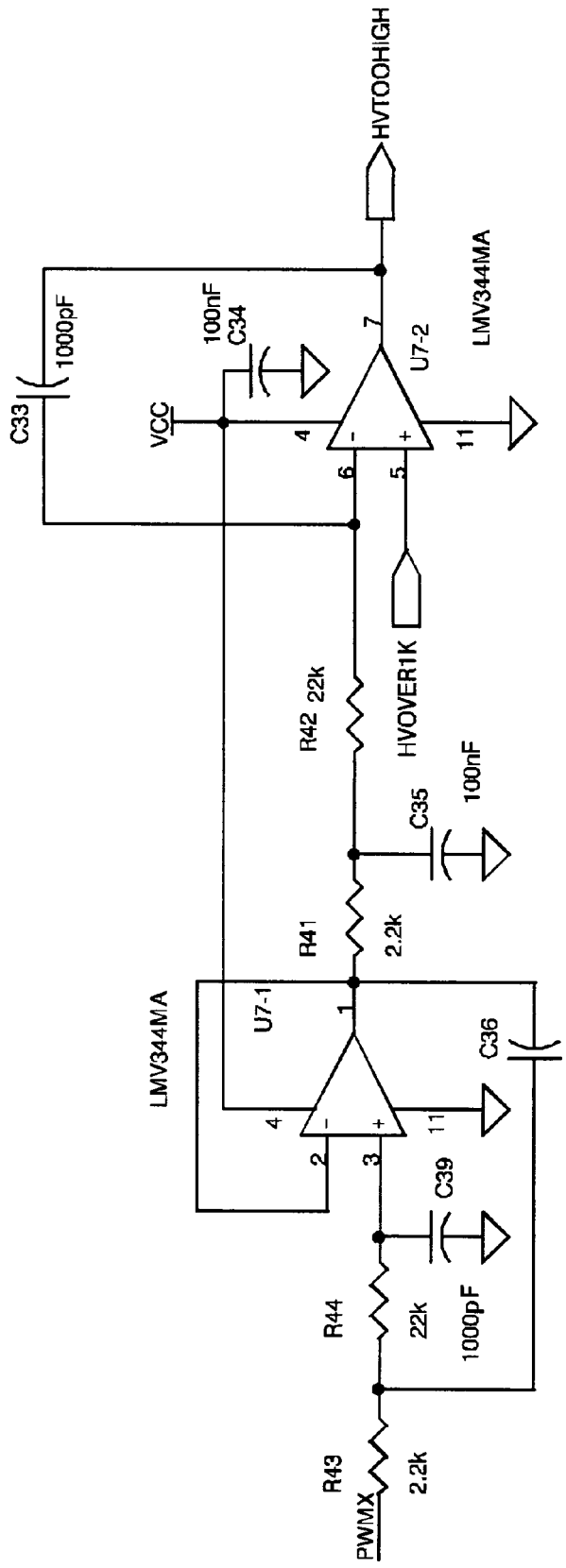
Figure 8F:
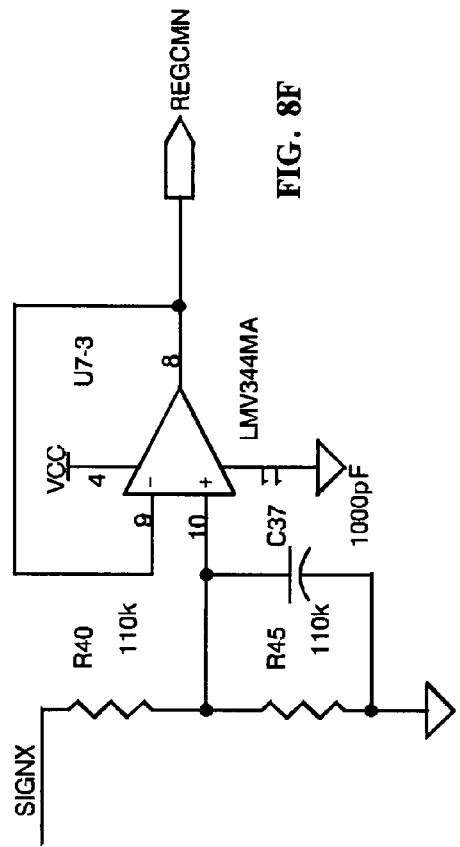
Figure 8G:
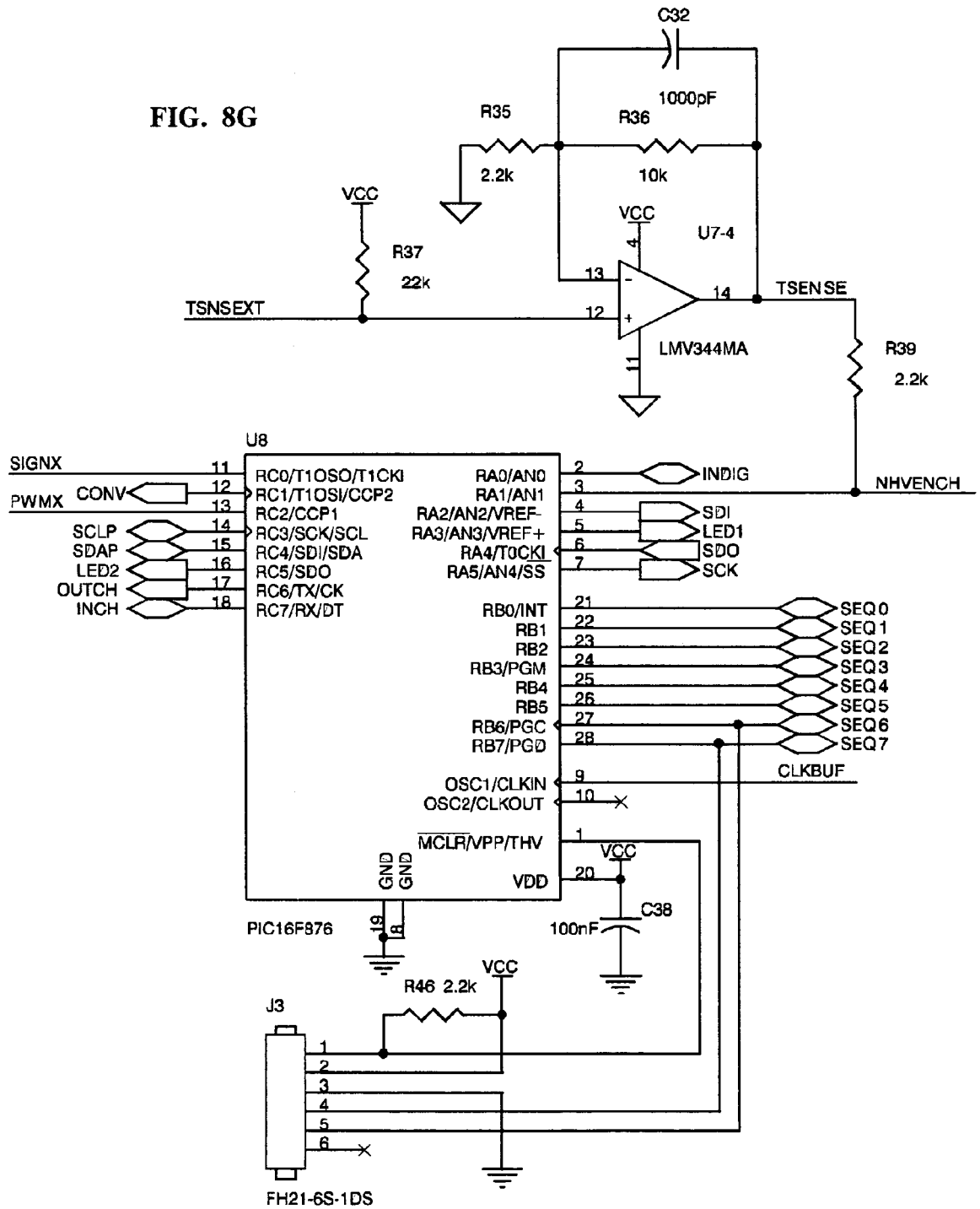

The high-voltage sequencer daughterboard consists of a controller unit that employs a microcontroller U8 shown in FIG. 8G and a "floating monitor" unit, FIG. 9 that floats to the voltage at the channel's high-voltage output. The controller unit uses an operational amplifier U7-4 of FIG. 8G to generate a control voltage for the regulator by comparing the resistively divided high-voltage output of the channel to a voltage reference that is set by low-pass filtering a PWM signal from the microcontroller. The microcontroller U8 uses 16-bit analog-to-digital converter measurements of the output voltage and current to adjust the PWM duty cycle to fine-tune the voltage output and to regulate current. The series capacitors C14 and C16 help to stabilize the regulation circuit. More capacitance produces a smoother output, but more sluggish response. Below a threshold value of 3 pF for the series capacitance of C14 and C16, the high-voltage output has significant unstable oscillations. Capacitor C33 also affects stability and responsiveness of the regulation.

Figure 9A:
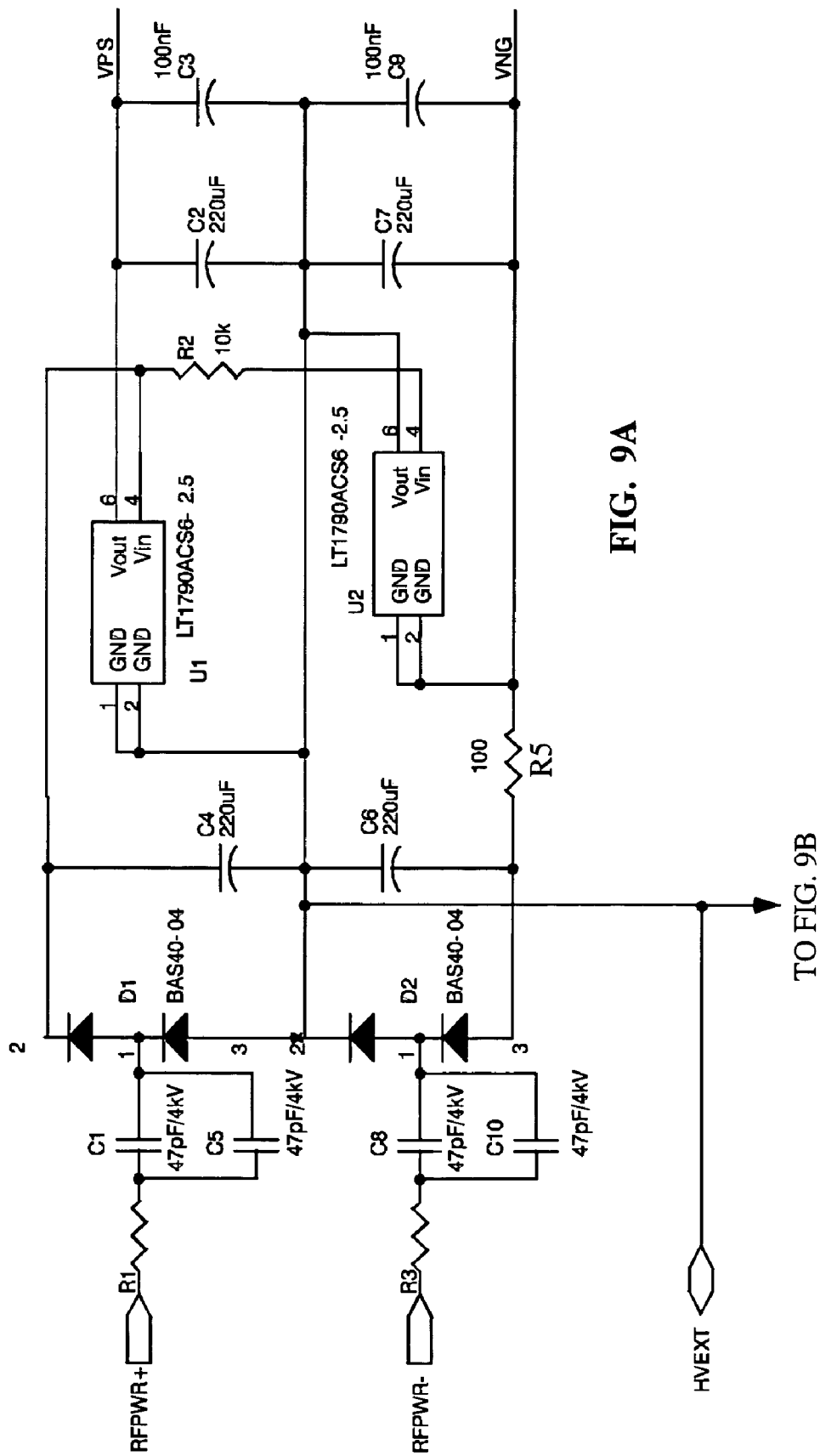
FIGS. 9A-9G schematically illustrate a floating monitor circuit and corresponding communications circuits that may be included in the invention.
Figure 9B:
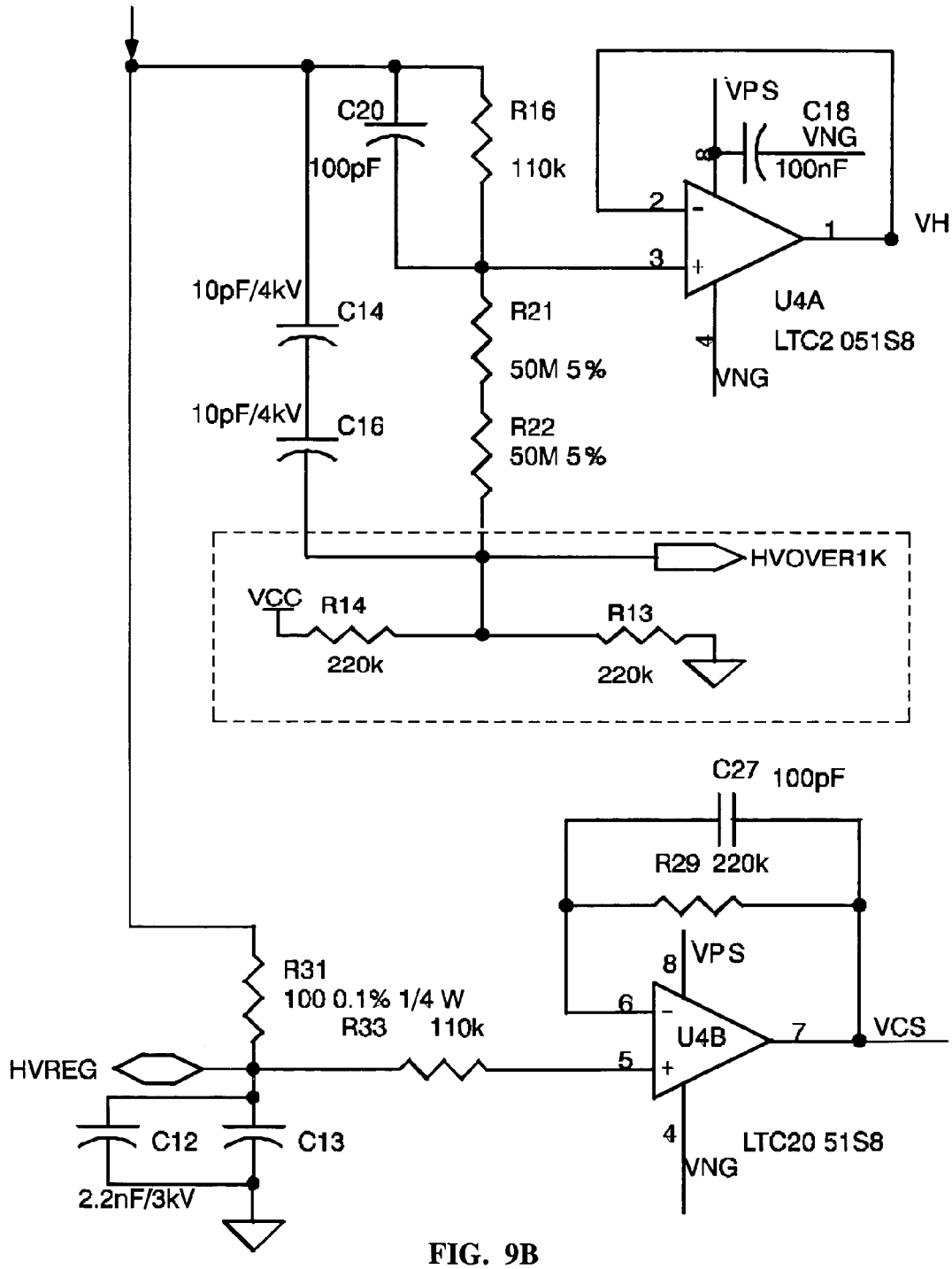
Figure 9C:
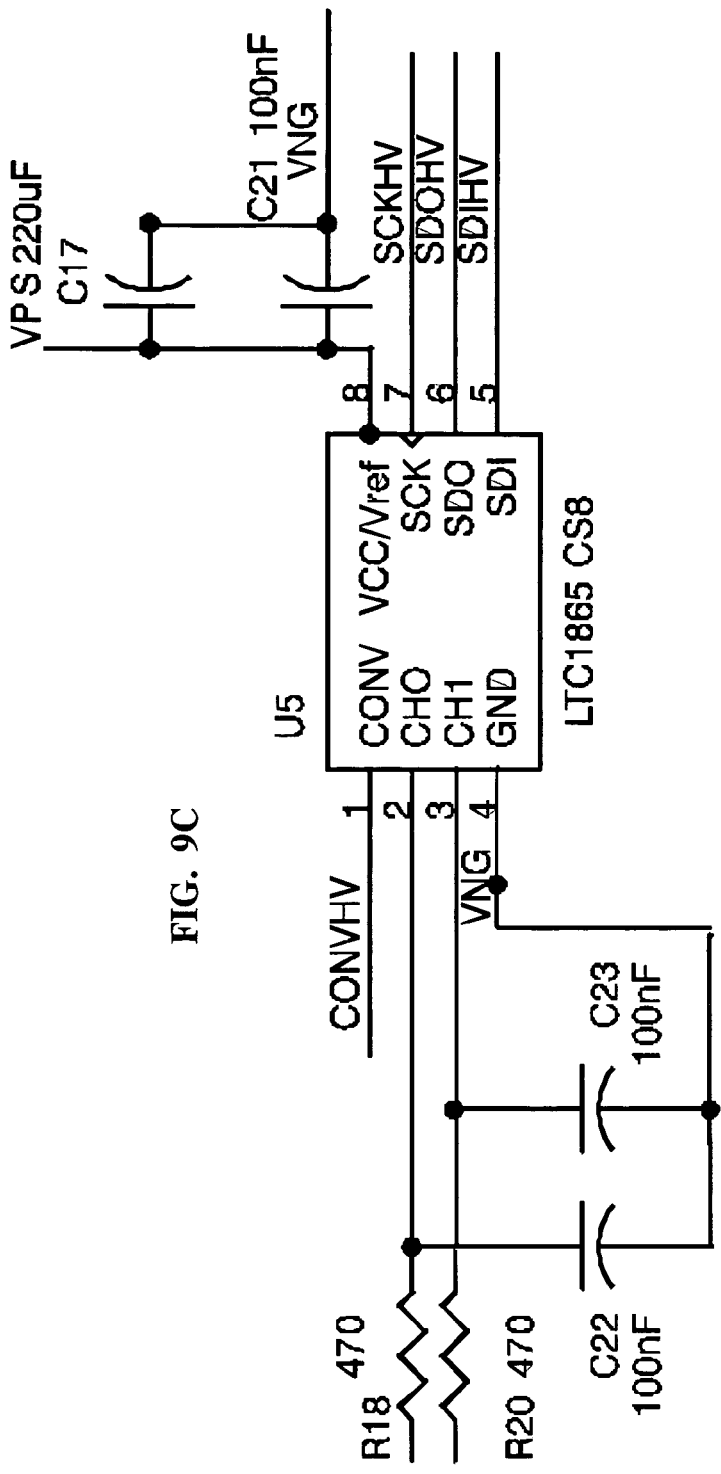
Figure 9D:
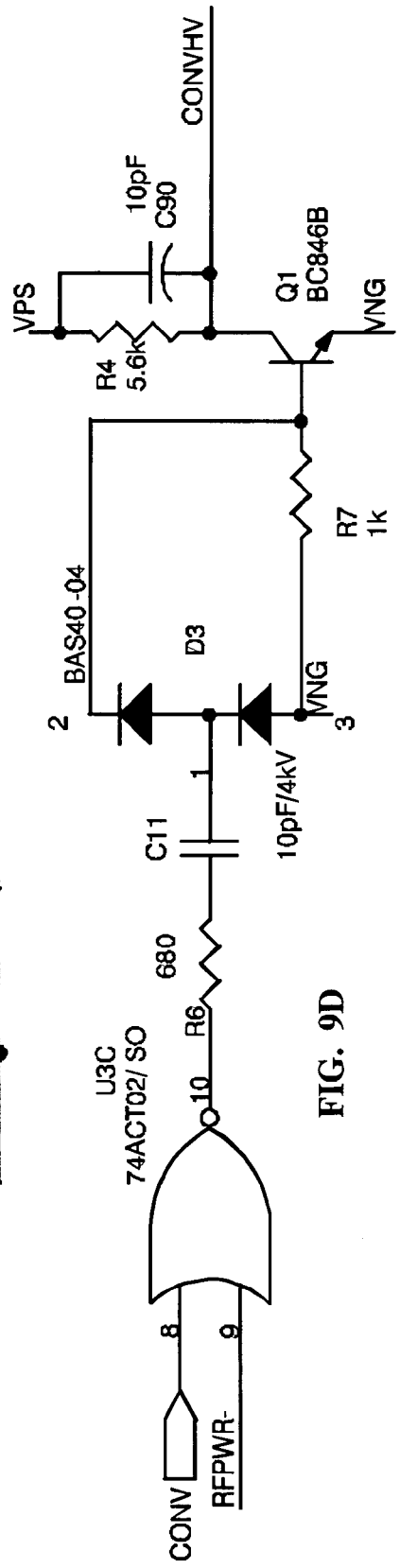
Figure 9E:
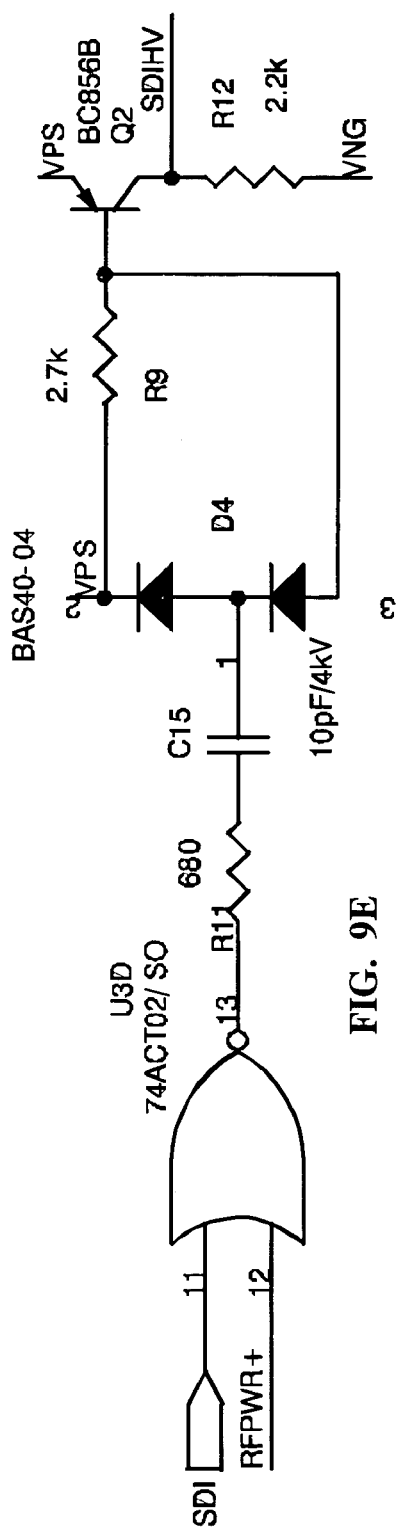
Figure 9F:
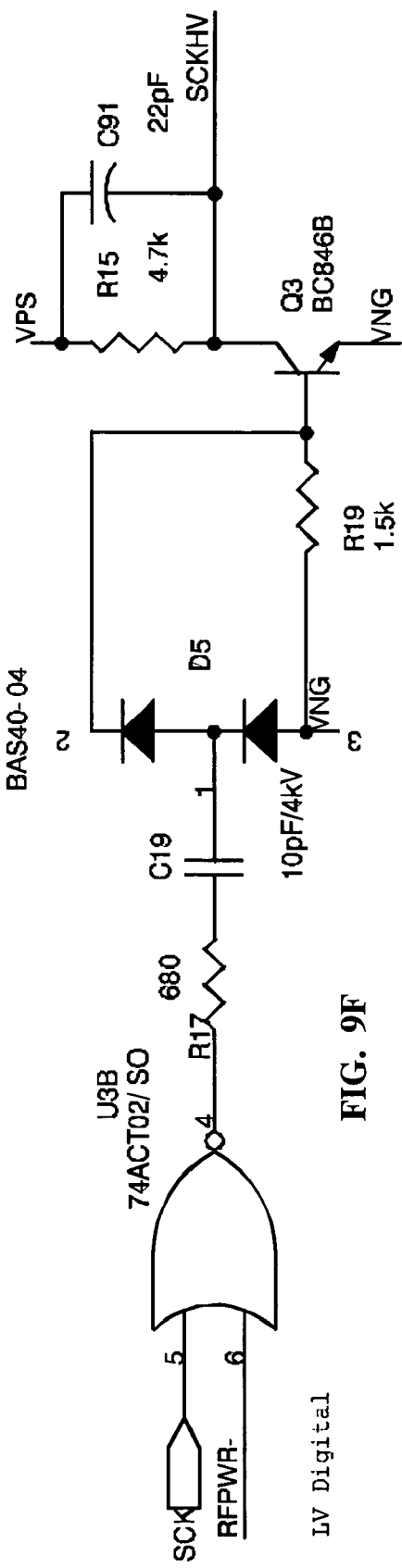
Figure 9G:
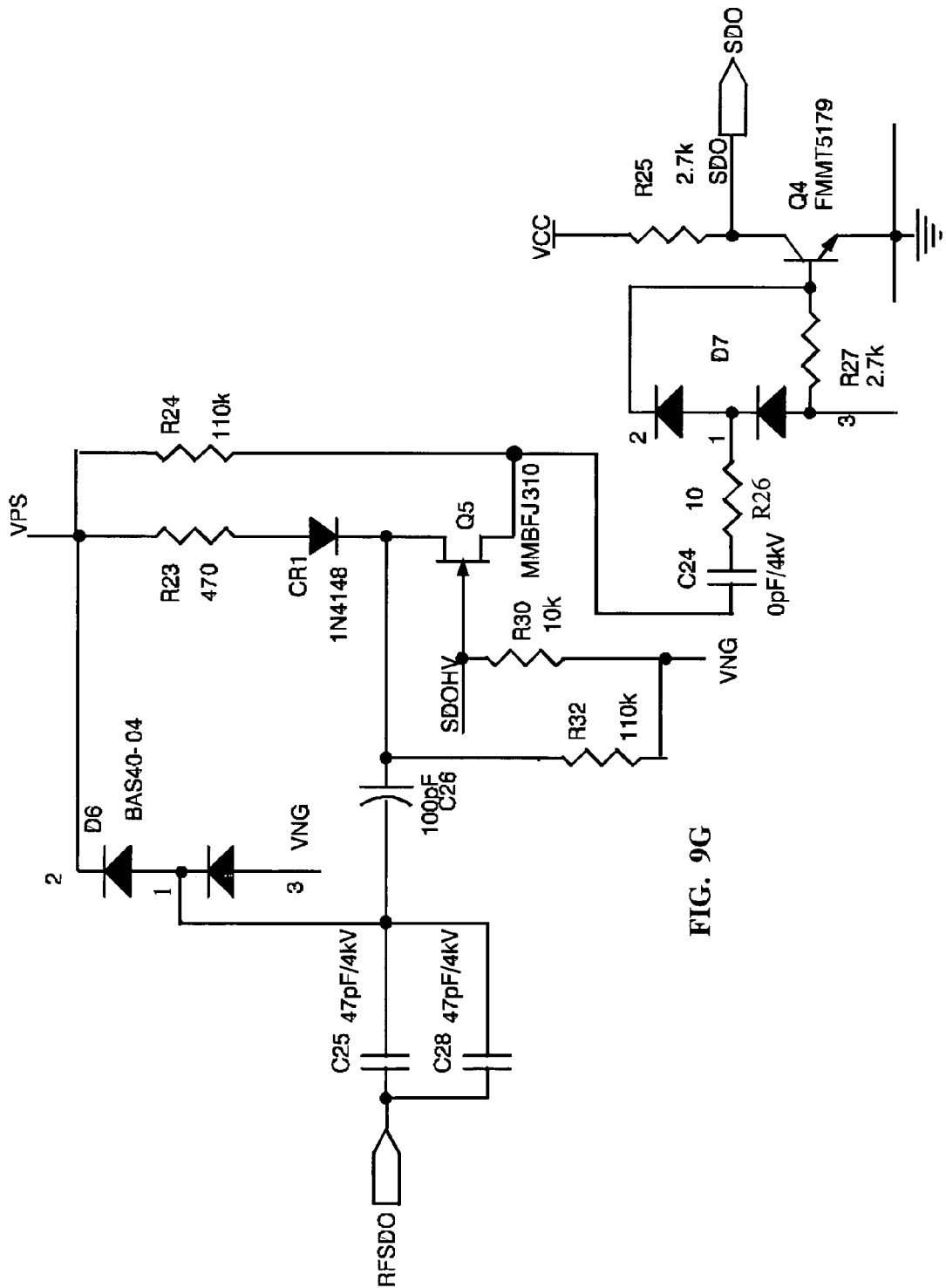

A novel element of this embodiment is the floating monitor. This monitor is powered by two precision 2.5 V voltage references that are driven by two rectified out-of-phase 20.48 MHz signals that are capacitively coupled to the floating circuit through high voltage capacitors C1 and C5, C8 and C10 (FIG. 9B). One signal supplies VPS, a voltage source at the output voltage +2.5 V and VNG, a voltage source at the output voltage −2.5 V. This power drives an operational amplifier U4A (FIG. 9B that buffers the resistively divided voltage and the voltage dropped across a current sense resistor from the regulator output to the actual channel output. These analog voltage- and current-sense signals go to a two-channel 16-bit analog-to-digital converter with a serial output, US. This converter requires three digital control signals and supplies one digital data signal out. These signals are passed across the high-voltage difference between the floating monitor and the microcontroller by on-off-key (OOK) modulating them at a 20.48 MHz carrier and coupling them through high-voltage capacitors to a simple envelope detector circuit consisting of a diode pair, two resistors, and a transistor that recovers the digital signals. The characteristics of the transistor and resistance values are chosen to obviate additional capacitors and circuit elements in the envelope detector. The three control signals from the microcontroller are modulated by the use of digital NOR gates (U3B, U3C, and U3D). The data signal from the floating monitor (SDOHV) is modulated by the use of a JFET transistor Q5 (FIG. 9G). The rest of the circuitry around Q5 is used to ensure that it remains properly biased in spite of rapid and prolonged swings in the output voltage. This communications circuitry operates at 1 MBaud from below 0° C. to above 85° C. and against at least +/−3000 V voltage swings in 350 microseconds.

Figure 10:
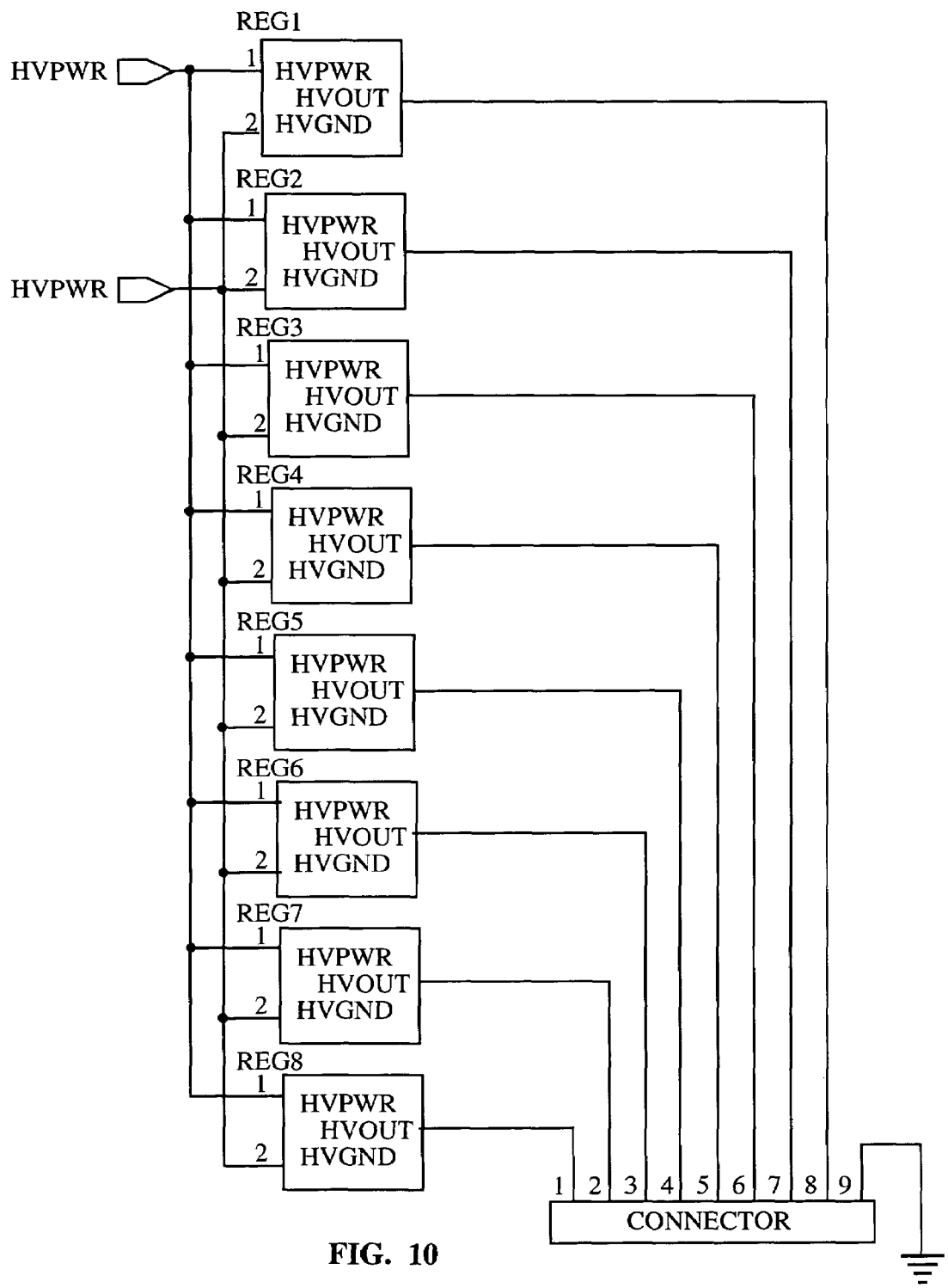
FIG. 10 shows connections between a regulator board and sequencer daughterboards and back panel that may be included in the invention.
Figure 11:
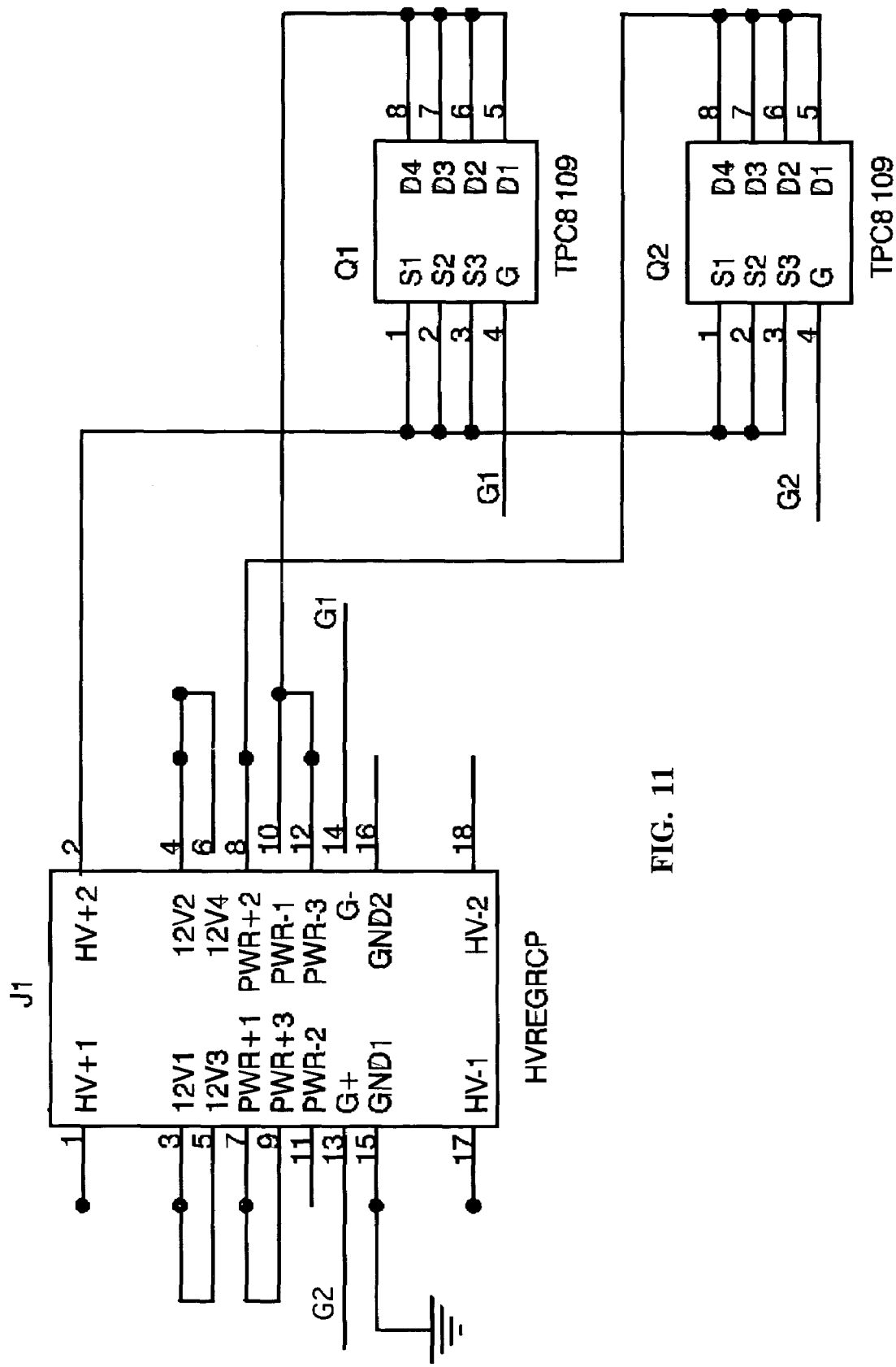
FIG. 11 illustrates a high voltage supply regulator transistor connected to a supply regulator daughterboard in accordance with the invention.

The high-voltage regulator board (FIG. 10) contains the high-voltage transistors to regulate the output voltage. All sequencer daughterboards (FIG. 10) and the supply regulator daughterboard (FIG. 11) connect to this board. FIG. 11 schematically illustrates the design of the high voltage supply output transistor circuitry and its connection to the supply regulator circuit of FIG. 10. The connector J2 connects to the high-voltage back panel.

Figure 12A:
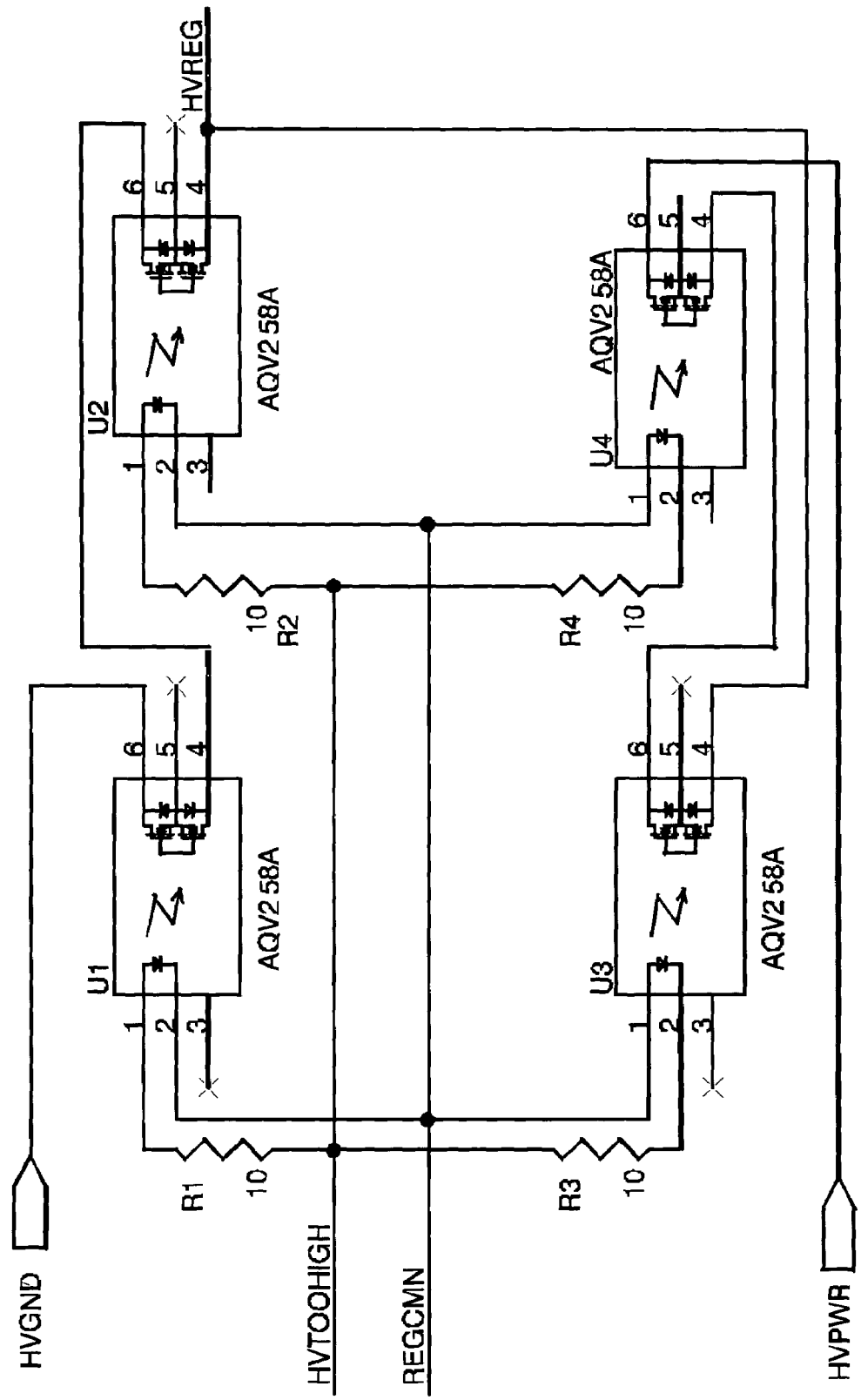
FIGS. 12A and 12B illustrate a class A high voltage regulator subcircuit that may be included in the invention.
Figure 12B:
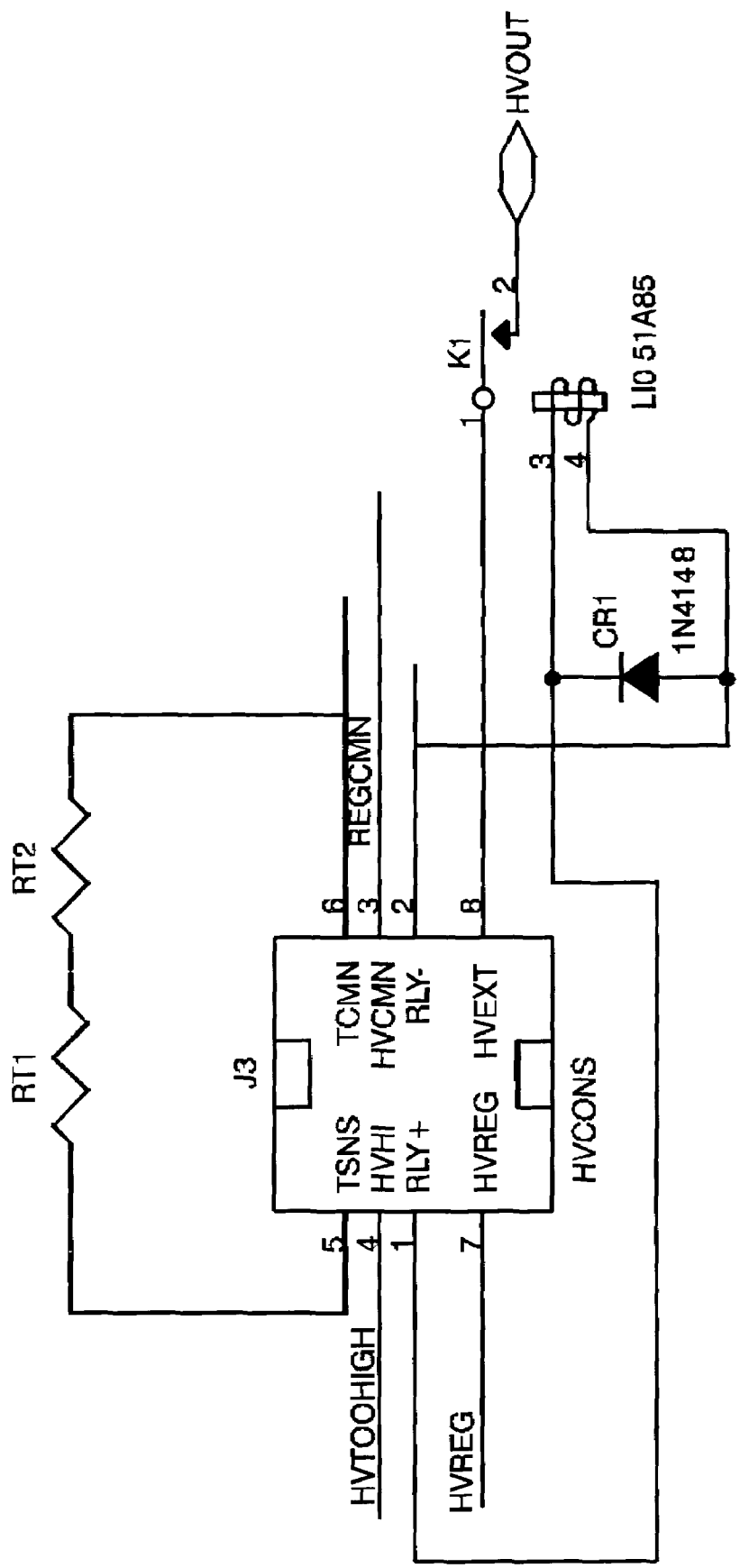

FIG. 12 shows one embodiment of the regulator. Using a Class A amplifier architecture, two photoMOS relays U1 and U2 arranged in series (totem-poled) boost the output voltage when the control voltage is sufficiently lower than 2.5 V that the photodiodes in one bank of photoMOS relays turn on. Another bank of two photoMOS relays U3 and U4 reduce the output voltage when the control voltage is sufficiently higher than 2.5 V to turn on their corresponding photodiodes. The approximate 2 to 3 V voltage range when neither photodiode emits light and the slew rate of the control signal ensure that only two relays conduct at a time. A reed relay may be used to isolate the channel completely from the back panel. The two thermistors are placed physically close to the two photoMOS relay banks to detect over temperature. This circuit ensures low leakage current at voltages up to and somewhat past the drain-to-source breakdown voltage of an individual photoMOS relay.

Figure 13A:
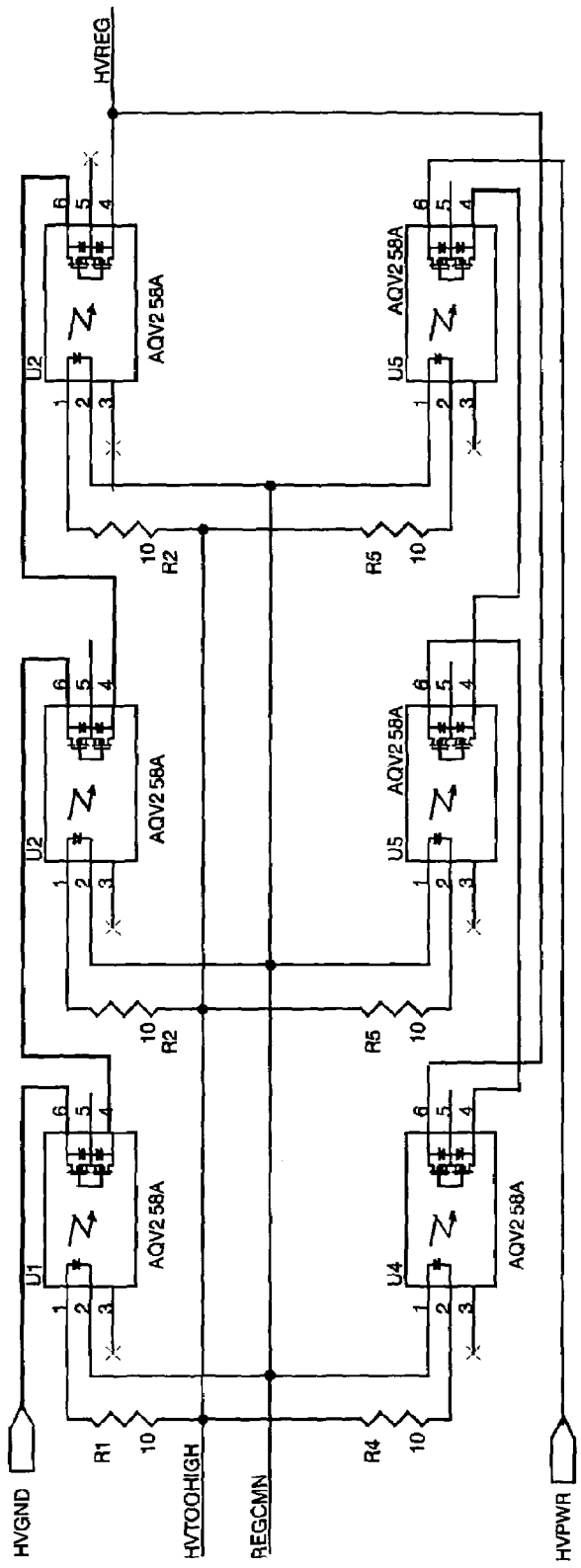
FIGS. 13A and 13B illustrate an alternate high voltage regulator circuit that may be included in the invention.
Figure 13B:
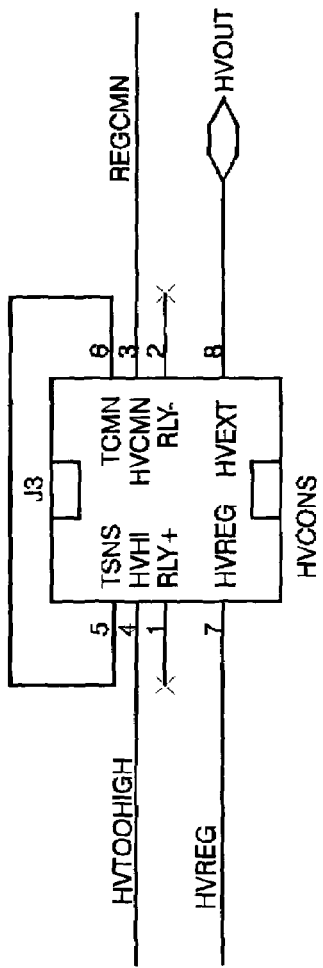

FIG. 13 shows an alternate circuit that employs two totem poles of three photoMOS relays U1, U2, U3 and U4, U5, U6, allowing higher-voltage operation somewhat beyond the two times the break down voltage of an individual photoMOS relay. For example, using a 1500 V-rated relay, the regulator circuit in FIG. 12 will run reliably with low leakage current (<<10 uA) at a supply voltage up to about 2 kV. The circuit in FIG. 13 has low leakage current (<<10 uA) past 3 kV.

Figure 14:
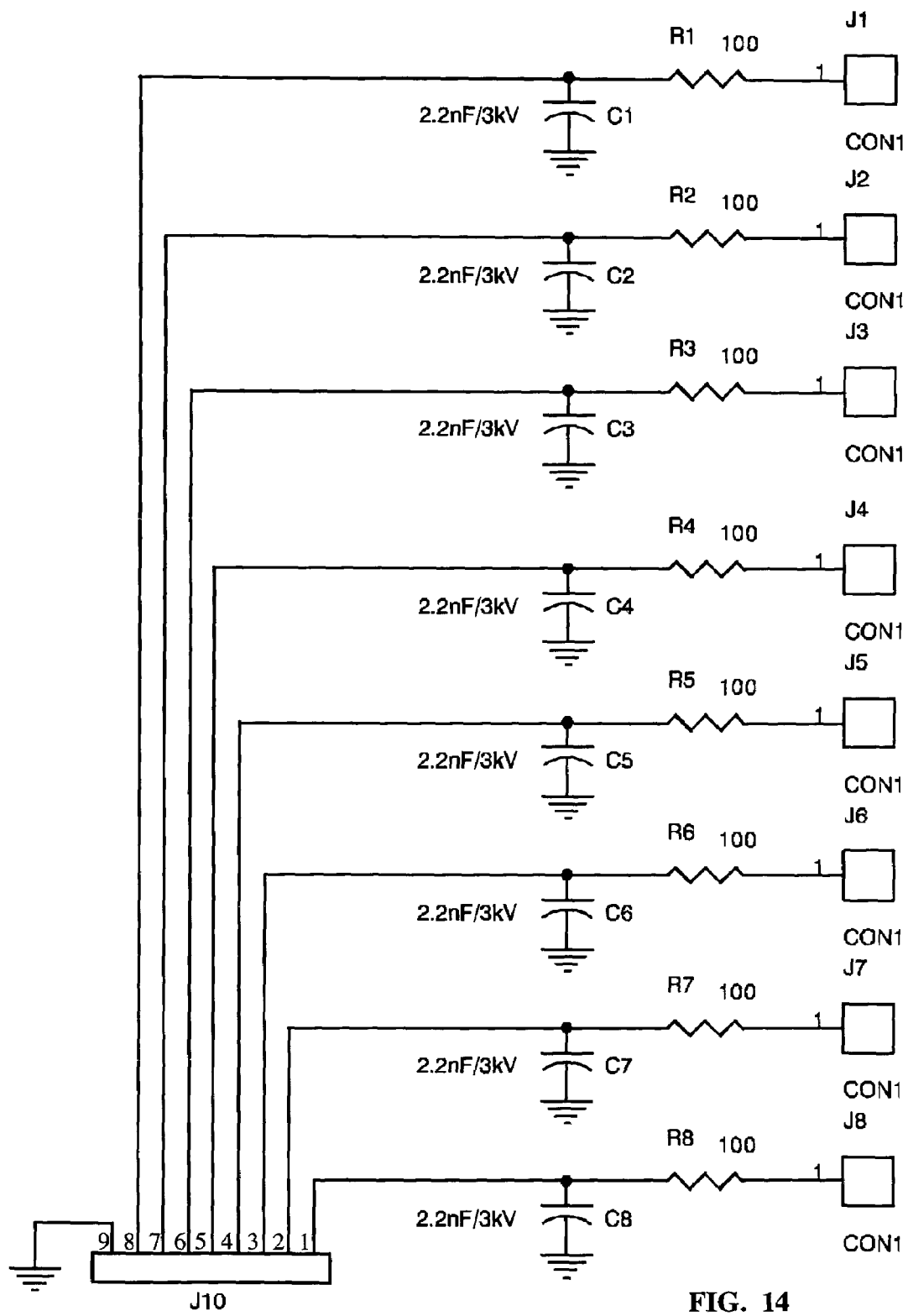
FIG. 14 is a schematic design of the high voltage back panel of FIG. 1.

Finally, FIG. 14 shows the high-voltage back panel design. The series resistors R1-R8 and capacitors C1-C8 help to protect the circuitry in the unit from damage or unreliable firmware execution as a result of external arcs or very fast voltage or current spikes. This resistances should either be low enough that the voltage drop across it is negligible or the sequencer should calculate and compensate for this voltage drop. The capacitors C1-C8 are optional, and in high-speed, high-impedance systems undesirable.

What is claimed is:

1. A high-voltage sequencer system, comprising:
a positive high-voltage supply;
a supply regulator connected to the positive high-voltage supply;
a negative high-voltage supply;
a master sequencer and programmable logic controller connected to the supply regulator to control operation thereof;
a high voltage regulator output circuit connected to the supply regulator to receive high voltage signals therefrom; and
a plurality of sequencer channels connected between the master sequencer and the programmable logic controller and the high voltage regulator output, the plurality of sequencer channels being arranged to provide signals to the high voltage regulator output to produce corresponding high-voltage signal outputs in selected sequences; the master sequencer and programmable logic controller being arranged to perform computations to affect the outcome of each selected sequence independently of one another wherein each of the sequencer channels is arranged to adjust its output state while executing a sequence of instructions.

2. The high-voltage sequencer system of claim 1 wherein the master sequencer and programmable logic controller is arranged to provide voltage regulation of the high-voltage signal outputs from the sequencer channels independently of one another.

3. The high-voltage sequencer system of claim 1 wherein the master sequencer and programmable logic controller is arranged to provide programmable regulation of the high-voltage signal outputs from the sequencer channels independently of one another.

4. The high-voltage sequencer system of claim 1 wherein each sequencer channel includes a voltage sensor and a current sensor and wherein the master sequencer and programmable logic controller is arranged to provide a regulated power output in each sequencer channel.

5. The high-voltage sequencer system of claim 1 wherein the master sequencer and programmable logic controller is arranged to provide current regulation of the high-voltage signal outputs from the sequencer channels independently of one another.

* * * * *